(12) United States Patent
Tetsuka

(10) Patent No.: US 7,854,180 B2
(45) Date of Patent: Dec. 21, 2010

(54) BICYCLE CONTROL DEVICE

(75) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 430 days.

(21) Appl. No.: 12/030,923

(22) Filed: Feb. 14, 2008

(65) Prior Publication Data

US 2009/0031841 A1     Feb. 5, 2009

(30) Foreign Application Priority Data

Jul. 30, 2007    (JP)    ............... 2007-197683

(51) Int. Cl.
*B62K 23/06*    (2006.01)
(52) U.S. Cl. ................. 74/473.12; 74/473.13; 74/502.2
(58) Field of Classification Search ............. 74/473.13, 74/473.12, 501.6, 502.2, 551.8, 491; 200/341, 200/501, 510, 61.28, 61.87, 61.88, 336; 267/168
See application file for complete search history.

(56) References Cited

U.S. PATENT DOCUMENTS

| | | | |
|---|---|---|---|
| 1,208,427 A | 12/1916 | White | |
| 4,065,983 A | 1/1978 | Mimura | |
| 4,143,557 A | 3/1979 | Wakebe et al. | |
| 4,900,291 A | 2/1990 | Patterson | |
| 5,201,824 A * | 4/1993 | Kato et al. | ................. 200/520 |
| 5,358,451 A | 10/1994 | Lacombe et al. | |
| 5,400,675 A | 3/1995 | Nagano | |
| 5,470,277 A | 11/1995 | Romano | |
| 5,479,776 A | 1/1996 | Romano | |
| 5,653,649 A | 8/1997 | Watarai | |
| 5,678,455 A | 10/1997 | Watarai | |
| 5,768,945 A | 6/1998 | Ose | |
| 5,941,125 A | 8/1999 | Watarai et al. | |
| 6,015,036 A | 1/2000 | Fukuda | |
| 6,031,190 A | 2/2000 | Tokuda et al. | |
| 6,038,923 A | 3/2000 | Lin | |
| 6,073,730 A | 6/2000 | Abe | |
| 6,216,078 B1 | 4/2001 | Jinbo et al. | |
| 6,227,068 B1 | 5/2001 | Masui et al. | |
| 6,467,786 B2 | 10/2002 | Horiuchi | |
| 6,546,827 B2 | 4/2003 | Irie | |

(Continued)

FOREIGN PATENT DOCUMENTS

DE     44 13 610 A1    11/1994

(Continued)

*Primary Examiner*—Richard W Ridley
*Assistant Examiner*—Terence Boes
(74) *Attorney, Agent, or Firm*—Global IP Counselors, LLP

(57) ABSTRACT

A bicycle control device is provided with a brake bracket, a brake lever, a first gearshift operating part, a second gearshift operating part, a first electrical switch, and a second electrical switch. The brake bracket is mountable to a handlebar. The brake lever is pivotally mounted to the brake bracket. The first gearshift operating part is movable relative to the brake lever. The second gearshift operating part is separate from the first gearshift operating part and movable relative to the brake lever. The first electrical switch is operated with the first gearshift operating part. The second electrical switch is operated with the second gearshift operating part. The second gearshift operating part is arranged such that when the first gearshift operating part is moved relative to the brake lever, the second gearshift operating part moves relative to the brake lever along with the first gearshift operating part.

18 Claims, 14 Drawing Sheets

U.S. PATENT DOCUMENTS

| | | |
|---|---|---|
| 6,698,307 B2 | 3/2004 | Wesling et al. |
| 6,698,567 B2 | 3/2004 | Dal Pra' |
| 6,941,834 B2 | 9/2005 | Irie |
| 6,991,081 B2 | 1/2006 | Uno et al. |
| 7,007,785 B2 | 3/2006 | Uno et al. |
| 7,080,723 B2 | 7/2006 | Uno et al. |
| 2001/0053724 A1 | 12/2001 | Campagnolo |
| 2003/0019712 A1 | 1/2003 | Wesling et al. |
| 2003/0074997 A1 | 4/2003 | Wesling et al. |
| 2005/0153865 A1 | 7/2005 | Detering et al. |
| 2008/0314183 A1 * | 12/2008 | Miki ...................... 74/473.13 |

FOREIGN PATENT DOCUMENTS

| | | |
|---|---|---|
| DE | 196 42 906 A1 | 4/1997 |
| EP | 0 601 211 A1 | 6/1994 |
| EP | 1 225 123 A1 | 7/2002 |
| EP | 1 375 325 A2 | 1/2004 |
| EP | 1 473 220 A1 | 11/2004 |
| EP | 1 813 525 A2 | 8/2007 |
| EP | 1 955 942 A2 | 8/2008 |
| FR | 2 654 698 A1 | 5/1991 |
| GB | 2 099 961 A | 12/1982 |
| JP | 60-85297 U | 6/1985 |
| WO | WO-94/01318 | 1/1994 |

* cited by examiner

BICYCLE CONTROL DEVICE

CROSS-REFERENCE TO RELATED APPLICATIONS

This application claims priority under 35 U.S.C. §119 to Japanese Patent Application No. 2007-197683, filed Jul. 30, 2007. The entire disclosure of Japanese Patent Application No. 2007-197683 is hereby incorporated herein by reference.

BACKGROUND OF THE INVENTION

1. Field of the Invention

This invention generally relates to a brake and gear shift device. More specifically, the present invention relates to a bicycle control device that is mounted to a handlebar of a bicycle for operating a braking device and for electrically operating an external gear changer apparatus.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the drive train.

There are known bicycle gear changer devices that are electric powered and configured such that they can be controlled electrically so as to change among a plurality of gear positions. This kind of electric-powered gear changer device is operated with a gear shifter device that can be mounted to a brake bracket or a brake lever of a brake operating device (e.g., Japanese Laid-Open Patent Publication No. 2005-153865). This conventional gear shifter device is electrically operates an external gear changer apparatus such as a front derailleur and a rear derailleur. Similarly to cable-type gear shifter devices a gear shifter is arranged on the right side of the handlebar for the rear derailleur and a gear shifter is arranged on the left side of the handlebar for the front derailleur. Each gear shifter has a gear shift switch having a lever member contrived to pivot both in an outward direction and an inward (toward the center) direction of the handlebar from an operation start position. The indexing position changes by one position in the upshift direction when the lever member is pivoted in one direction and one position in the downshift direction when the lever member is pivoted.

The conventional gear shifter device described above is contrived to execute two types of gear shifting, e.g., upshifting or downshifting, by pivoting the lever member in different directions from the operation start position. Consequently, in order to change gears, the lever member must be pivoted toward the middle or the outside of the handlebar from the operation start position with an index finger or middle finger of a rider's hand while the rider grips the brake bracket or a curved end portion of the handlebar. When the lever member is pivoted toward the middle of the handlebar in order to execute a gear shift operation, the gear shift operation is comparatively easy to execute because the lever member is pivoted using the ventral side (palm side) of the finger by pressing with the finger in a curved state. However, when the lever member is pivoted toward the outside of the handlebar, the gear shift operation is comparatively difficult to execute because the lever member is pivoted using the dorsal side (knuckle side) of the finger by pressing with the finger in an extended state.

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

In order to avoid this difficulty, it is feasible to provide two gearshift operating parts that are pivotally arranged near a back surface of the brake lever and contrived to turn two electrical switches on and off in response to the pivot movement of the gearshift operating parts. Such an arrangement would enable two types of gear shift operations to be executed by operating two gear shift members in the same direction. However, when two different types of gear shift operation are accomplished by operating two gearshift operating parts in the same direction, one gearshift operating part sometimes gets in the way when the other gearshift operating part is operated. For example, if one gearshift operating part is arranged near the finger tips and the other gearshift operating part is arranged closer to the palm of the hand, then the gearshift operating part arranged closer to the palm of the hand impedes the operation of the gearshift operating part arranged near the finger tips because the operating finger must reach across the gear shift member arranged closer to the palm of the hand. There is also the possibility that the gearshift operating part arranged closer to the palm of the hand will be moved accidentally, causing an unintentional change of gears, when the rider is attempting to operating the gearshift operating part located near the fingertips. Consequently, the rider must be careful when shifting gears and it is troublesome to execute two different types of gear change operation.

One object of the present invention is to provide is to provide a gear shifter device for operating an electric-powered gear changer device that enables two different types of gear shift operation to be executed easily while preventing the occurrence of unintended gear shifting.

In accordance with a first aspect of the present invention, a bicycle control device is provided that basically comprises a brake bracket, a brake lever, a first gearshift operating part, a second gearshift operating part, a first electrical switch, and a second electrical switch. The brake bracket is configured to be mounted to a handlebar. The brake lever is pivotally mounted to the brake bracket. The first gearshift operating part is movable relative to the brake lever. The second gearshift operating part is separate from the first gearshift operating part and movable relative to the brake lever. The first electrical switch is operated with the first gearshift operating part. The second electrical switch is operated with the second gearshift operating part. The second gearshift operating part is arranged such that when the first gearshift operating part is moved relative to the brake lever, the second gearshift operating part moves relative to the brake lever along with the first gearshift operating part.

With this bicycle control device, a brake can be operated by pivoting the brake lever. Additionally, a gear change operation can be executed by operating the first gearshift operating part so as to turn the first electrical switch on and off and a second gear change operation can be executed by operating the second gearshift operating part so as to turn the second electrical switch on and off. Since the gear change operations are executed with two separate gearshift operating parts, the movement directions of the gearshift operating parts can be set independently from each other. For example, both of the gearshift operating parts can be contrived such that the movement direction thereof is inward toward the middle of the handlebar. Thus, two different types of gear change operation can be accomplished using only the ventral side of a finger tip. Furthermore, since the second gearshift operating part moves together with the first gearshift operating part when the first gearshift operating part is moved, the second gearshift operating part can be moved in the same direction as the first gearshift operating part. Consequently, the second gearshift operating part does not impede the operation of the first gearshift operating part. Since the second gearshift operating part moves together with the first gearshift operating part, the second gearshift operating part is not likely to be operated unintentionally when the first gearshift operating part is operated. As a result, two types of gear change operation can be accomplished using a finger tip while preventing the occurrence of unintended gear change operations.

A bicycle control device in accordance with a second aspect of the present invention is the device in accordance with the first aspect, wherein the first gearshift operating part is arranged such that when the second gearshift operating part is moved relative to the brake lever, the first gearshift operating part does not move relative to the brake lever. With this aspect of the invention, even if the second gearshift operating part is arranged closer to the palm (closer to the handlebar) than the first gearshift operating part, the force required to operate the second gearshift operating part is lightened because only the second gearshift operating part moves when the second gearshift operating part is operated.

A bicycle control device in accordance with a third aspect of the present invention is the device in accordance with the first or second aspect, wherein the first gearshift operating part has a contacting part that presses against the second gearshift operating part when the first gearshift operating part is moved relative to the brake lever. With this aspect of the invention, the second gearshift operating part can be moved easily when the first gearshift operating part is moved because the contacting part presses against the second gearshift operating part and moves it.

A bicycle control device in accordance with a fourth aspect of the present invention is the device in accordance with any one of the first to third aspects, wherein the first gearshift operating part is movably from a first rest position to a first operating position by a first movement distance where the first electrical switch is actuated, the second gearshift operating part is movably from a second rest position to a second operating position by a second movement distance where the second electrical switch is actuated, and the first movement distance of the first gearshift operating part is shorter than the second movement distance of the second gearshift operating part. With this aspect of the invention, since the distance through which the second gearshift operating part must move before the corresponding electrical switch is actuated is larger than the distance through which the first gearshift operating part must move, the second gearshift operating part does not reach the second operating position when it moves together with the first gearshift operating part during operation of the first gearshift operating part. As a result, unintentional actuation of the second electrical switch can be prevented with a simple structure.

A bicycle control device in accordance with a fifth aspect of the present invention is the device in accordance with the fourth aspect that further comprises: a first spring member for is provided between the first gearshift operating part and the first electrical switch actuating the first electrical switch; and a second spring member is provided between the second gearshift operating part and the second electrical switch for actuating the second electrical switch, with a free length of the first spring member being shorter than a free length of the second spring member.

When first gearshift operating part is moved from the rest position, the first spring member is compressed and the spring force thereof increases. The first electrical switch is actuated when the spring force becomes sufficient to actuate the first electrical switch. Similarly, when second gearshift operating part is moved from the second rest position, the second spring member is compressed and the spring force thereof increases. The second electrical switch is actuated when the spring force becomes sufficient to actuate the second electrical switch. Thus, the movement distances through which the first and second gearshift operating parts move from the first and second rest positions to the first and second operating positions, respectively, can be adjusted as desired with a simple structure by simply using first and second spring members having different free lengths.

A bicycle control device in accordance with a sixth aspect of the present invention is the device in accordance with the fifth aspect that further comprises a third spring member is provided between the first gearshift operating part and the first electrical switch provided in a free state for returning the first gearshift operating part to the first rest position; and a fourth spring member is provided between the second gearshift operating part and the second electrical switch for returning the second gearshift operating part to the second rest position; with the first and second spring members being provided in a free state, the third and fourth spring members being provided in a compressed state and a spring constant of the third and fourth spring members being smaller than a spring constant of the first and second spring members. Since the first and second spring members are provided in a free state, initially, the comparatively small spring forces of the third and fourth spring members are acting against the first and second gearshift operating parts. As the first or second spring member is compressed, a larger spring force acts on the first or second gearshift operating part. As a result, the spring force increases at an intermediate position during operation of the gearshift operating part, making it easier for the rider to recognize that the gearshift operating part is drawing near to the first or second operating position.

A bicycle control device in accordance with a seventh aspect of the present invention is the device in accordance with any one of the first to sixth aspects, wherein: the first gear shift member has a first operating surface for executing a gear shift operation; and the second gearshift operating part has a second operating surface arranged in close proximity to the first operating surface. In this aspect of the invention, it is easier to operate the two operating surfaces with only a finger tip because the first and second gearshift operating parts are arranged such that the first and second operating surfaces are close to each other.

A bicycle control device in accordance with an eighth aspect of the present invention is the device in accordance with the seventh aspect, wherein the first operating surface has a first texture that is different from a second texture of the second operating surface. With this aspect of the invention, the difference between the first gearshift operating part and the second gearshift operating part can be recognized by the sense of touch of a finger tip. As a result, unintended gear change operations are reduced and two types of gear change operation are easier to execute.

A bicycle control device in accordance with a ninth aspect of the present invention is the device in accordance with the seventh aspect, wherein one of the first and second operating surfaces is a roughened surface and the other is a smooth surface. With this aspect of the invention, the difference feeling to the touch can be made more obvious based on the difference in texture between the roughened surface and the smooth surface. Additionally, if a flexible material is used, the movement distance can be increased by utilizing the bending (flexing) of the material.

A bicycle control device in accordance with a tenth aspect of the present invention is the device in accordance with the eighth or ninth aspect, wherein a hardness of the first operating surface is different from a hardness of the second operating surface. With this aspect of the invention, the difference feeling to the touch can be made more obvious based on the difference in hardness of the two gearshift operating parts.

A bicycle control device in accordance with an eleventh aspect of the present invention is the device in accordance with any one of the first to tenth aspects, wherein the brake lever has a side wall having a cut-away portion; and at least a portion of the first gearshift operating part is arranged inside the cut-away portion. With this aspect of the invention, since at least a portion of the first gearshift operating part is arranged inside the cut-away portion formed in a side wall of the brake lever, the first gearshift operating part can be moved easily while keeping one's figure on the brake lever.

A bicycle control device in accordance with a twelfth aspect of the present invention is the device in accordance with any one of the first to eleventh aspects, wherein the first and second gearshift operating parts are pivotally with respect to the brake lever with the first and second gearshift operating parts being pivoted in same directions with respect to the brake lever when a gear shift operation is performed by each of the first and second gearshift operating parts. With this aspect of the present invention, the first and second gearshift operating parts are easier to operate with a finger tip because both the first and second gearshift operating parts are contrived to pivot and the pivot direction of both members is the same.

A bicycle control device in accordance with a thirteenth aspect of the present invention is the device in accordance with the twelfth aspect, wherein the first and second gearshift operating parts are pivotally connected to the brake lever about a single pivot axis. With this aspect of the invention, since the first and second gearshift operating parts are connected to the brake lever such that they both pivot about the same axis, both gearshift operating parts can be connected with a single pivot shaft and the structure with which the first and second gearshift operating parts are connected to the brake lever can be simplified.

A bicycle control device in accordance with a fourteenth aspect of the present invention is the device in accordance with any one of the first to thirteenth aspects, wherein the brake lever has a guide section that guides at least one of the first and second gearshift operating parts in a movement direction. With this aspect of the invention, when the first and second gearshift operating parts are moved in order to change gears, at least one of the first and second gearshift operating parts is guided by the guide section of the brake lever. As a result, the guided gearshift operating part(s) moves smoothly, making the gear shift member even easier to operate with a finger tip.

With the present invention, since the gear change operations are executed with two separate gearshift operating parts, the movement directions of the gearshift operating parts can be set independently from each other. For example, both of the gearshift operating parts can be contrived such that the movement direction thereof is inward toward the middle of the handlebar. Thus, two different types of gear change operation can be accomplished using only the ventral side of a finger tip.

Furthermore, since the second gearshift operating part moves together with the first gearshift operating part when the first gearshift operating part is moved, the second gearshift operating part can be moved in the same direction as the first gearshift operating part. Consequently; even if the first gearshift operating part is arranged closer to the finger tips (farther from the handlebar) than the second gearshift operating part, the second gearshift operating part does not impede the operation of the first gearshift operating part. As a result, two difference types of gear change operation can be executed while preventing unintended gear change operations.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
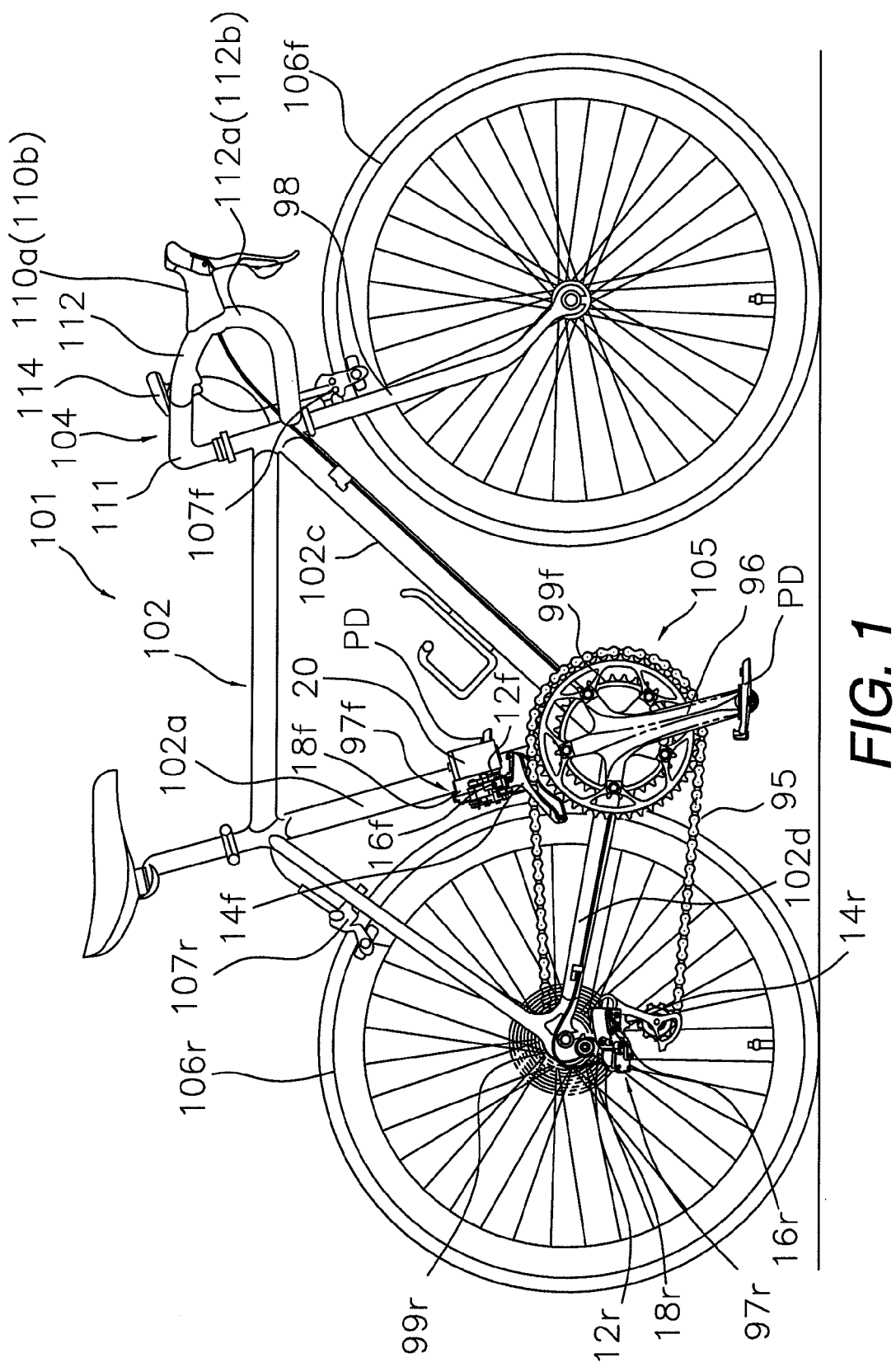
FIG. 1 is a side elevational view of a bicycle equipped with a pair of bicycle (brake/derailleur) control devices in accordance with one embodiment of the present invention.

Referring initially to FIG. 1, a bicycle 101 is illustrated in accordance with a first embodiment of the present invention. FIG. 1 shows a bicycle 101 in which an embodiment of the present invention is employed. The bicycle 101 is a "road racer" (racing style road bike). The bicycle 101 basically includes a diamond-shaped frame 102 having a front fork 98, a handlebar unit 104 fastened to the front fork 98, a drive unit 105, a front wheel 106f mounted to the front fork 98 and a rear wheel 106r mounted to a rear portion of the frame 102. The drive unit 105 basically includes a chain 95, a crank 96 on which pedals PD are mounted, a motorized front derailleur 97f, a motorized rear derailleur 97r, a front sprocket cluster 99f, and a rear sprocket cluster 99r. The rear and front derailleurs 97r and 97f are examples of bicycle gear changing devices in accordance with one embodiment. The bicycle 101 also includes a front brake device 107f, a rear brake device 107r, and a pair (right and left) control devices 110a and 110b. The right control device 110a is configured to control the rear derailleur 97r and the front brake device 107f. The left control device 110b is configured to control the front derailleur 97f and the front brake device 107r.

The handlebar unit 104 comprises a handlebar stem 111 and a handlebar 112 that is fitted into and fastened to the upper end of the handlebar stem 111 as shown in FIG. 1. The handlebar stem 111 is fitted into and fastened to the upper part of the front fork 98. The handlebar 112 is a drop-type handlebar having U-shaped curved sections 112a and 112b on both ends thereof, and the curved sections 112a and 112b are arranged such that the curved portions thereof protrude in the forward direction. The control devices 110a and 110b are mounted on the handlebar 112 for operating the rear and front derailleurs 97r and 97f, and the front and rear devices 107f and 107r, respectively. The control device 110a is arranged on the right-hand end of the handlebar 112 when the bicycle 101 is viewed from the rear. The control device 110b is arranged on the left-hand end.

The control devices 110a and 110b are connected to the front and rear brake devices 107f and 107r, respectively, with Bowden-type brake cables (not shown). The control devices 110a and 110b are also connected to the rear and front derailleurs 97r and 97f, respectively, with electrical wires. A cycle computer 114 is configured to display speed and traveled distance of the bicycle is arranged in a middle portion of the handlebar 112. Thus, the cycle computer 114 functions as a speed indicator.

The front derailleur (FD) 97f is mounted to a seat tube 102a of the frame 102. The front derailleur 97f is configured such that it can be controlled electrically. The front derailleur 97f is an electrically driven derailleur that is configured to move its chain guide to either of indexing positions F1 or F2 in response to a gear shifting operation of the control device 110b so that the chain 95 is moved onto the corresponding sprocket of the front sprocket cluster 99f. The front derailleur 97f basically includes a mounting member 112f, a chain guide 14f and a four-point linkage mechanism 16f. The mounting member 12f is fastened to the seat tube 102a of the frame 102. The chain guide 14f is configured and arranged such that it can be moved toward and away from the mounting member 12f. The chain guide 14f guides the chain 95 by moving between the first position SP1 and the second position SP2. The four-point linkage mechanism 16f is arranged to connect the chain guide 14f to the mounting member 12f. The front derailleur 97f is operated with an electric drive unit 18f that is arranged and configured to drive the four-point linkage mechanism 16f in such a manner as to move the chain guide 14f.

The rear derailleur (RD) 97r is configured such that it can be controlled electrically. The rear derailleur (RD) 97r is mounted to a rear portion of a chain stay 102d of the frame 102. The rear derailleur 97r f is an electrically driven derailleur that is configured to move its chain guide to any one of ten indexing positions R1 or R10 in response to a gear shifting operation of the control device 110a so that the chain 95 is moved onto the corresponding sprocket the rear sprocket cluster 99r. The rear derailleur 97r basically includes a mounting member 12r, a chain guide 14r and a four-point linkage mechanism 16r. The mounting member 12r is fastened to the rear portion of the chain stay 102d of the frame 102. The chain guide 14r is configured and arranged such that it can be moved relative to the mounting member 12r. The four-point linkage mechanism 16r is arranged to connect the chain guide 14r to the mounting member 12f.

The rear derailleur 97r is operated with an electric drive unit 18r that is arranged and configured to drive the four-point linkage mechanism 16r in such a manner as to move the chain guide 14r. A power supply device 20 is mounted to the front derailleur 97. The power supply device 20 serves as a power source for the front and rear derailleurs 97f and 97r.

The front sprocket cluster 99f has a plurality of (e.g., two) sprockets that are arranged along the axial direction of the crank axle and have different tooth counts. The two sprockets are arranged to be aligned with the indexing positions F1 and F2. The rear sprocket cluster 99f has a plurality of (e.g., ten) sprockets that are arranged along the axial direction of the hub axle of the rear wheel 106r, and each sprocket has a different tooth count. The ten sprockets are arranged to be aligned with the indexing positions R1 and R10.

The sprockets of the front sprocket cluster 99f are arranged such that the sprocket located on the inward side and corresponding to the indexing position F1 is a low sprocket and the sprocket located on the outward side and corresponding to the indexing position F2 is a top sprocket having a larger tooth count than the low sprocket. The sprockets of the rear sprocket cluster 99r are arranged such that the innermost sprocket corresponding to the indexing position R1 is a low sprocket having the most teeth and the outermost sprocket corresponding to the indexing position R10 is a top sprocket having the smallest number of teeth. Thus, the tooth counts of the sprockets decrease as one moves from the inside toward the outside of the cluster.

Since the control devices 110a and 110b are mirror-symmetrical with respect to each other, the following explanation will focus chiefly on the control device 110a, which is arranged on the right side of the handlebar 112. In the following explanations, the term "inward" refers to a direction oriented toward the middle of the handlebar 112 from one end or the other of the handlebar 112, and "outward" refers to a direction oriented toward an end of the handlebar 112 from the middle of the handlebar 112.

Figure 2:
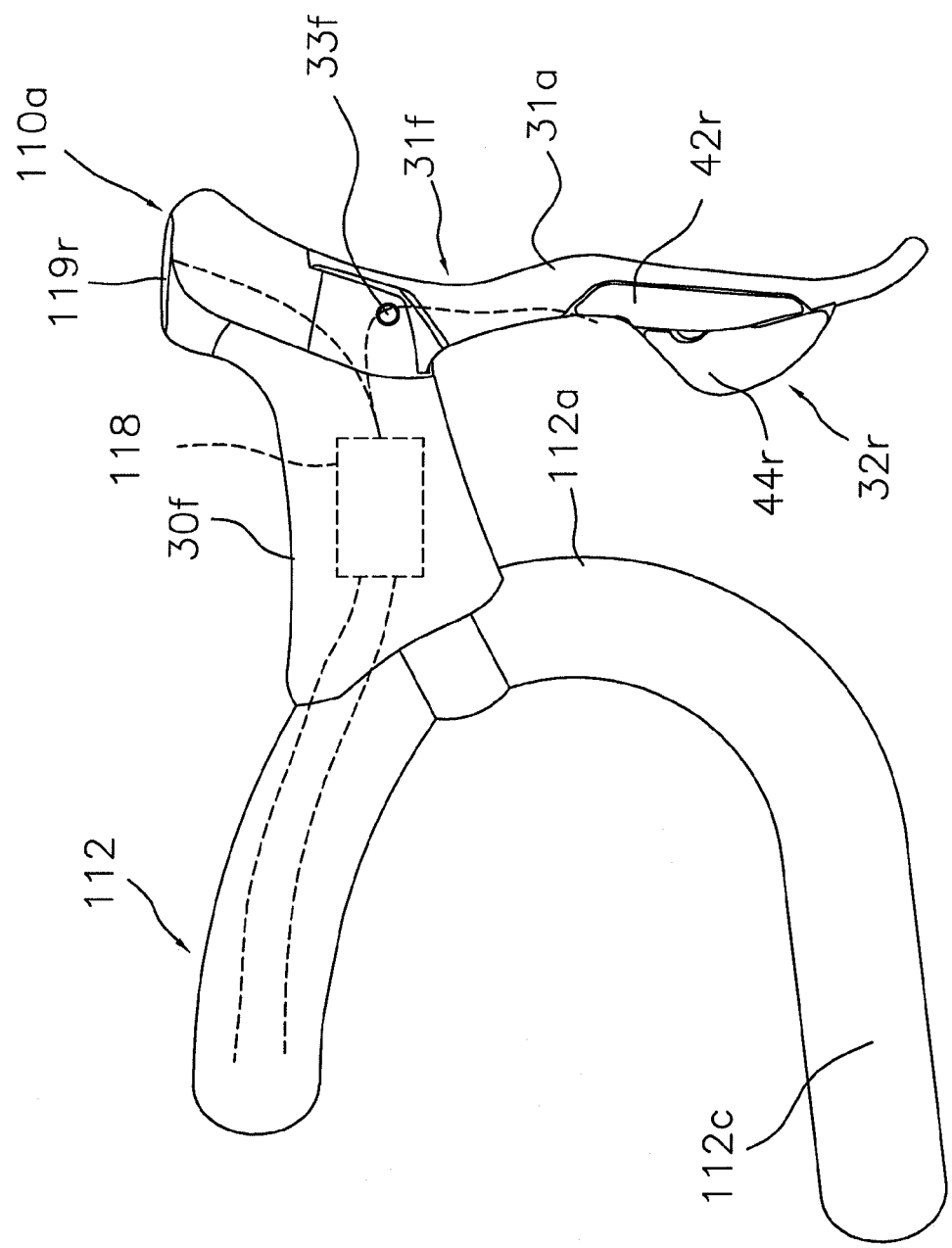
FIG. 2 is an enlarged side elevational view of the bicycle (brake/derailleur) control device for operating the front brake of the bicycle.

As shown in FIG. 2, the control device 110a is mounted to the curved section 112a of the handlebar 112. The control device 110a has a brake bracket 30f contrived to be mounted to the handlebar 112, a brake lever 31f that is pivotally mounted to the brake bracket 30f, and a rear derailleur operating unit 32r that is mounted to the brake lever 31f.

The brake bracket 30f is configured to be mounted to the curved section 112a of the handlebar 112. As shown in FIG. 2, a rear indexing position display device 119r indicates the indexing position of the rear derailleur 97r is provided on an upper frontal portion of the brake bracket 30f. A connector section 118 is provided inside the brake bracket 30f for connecting wires.

Figure 8:
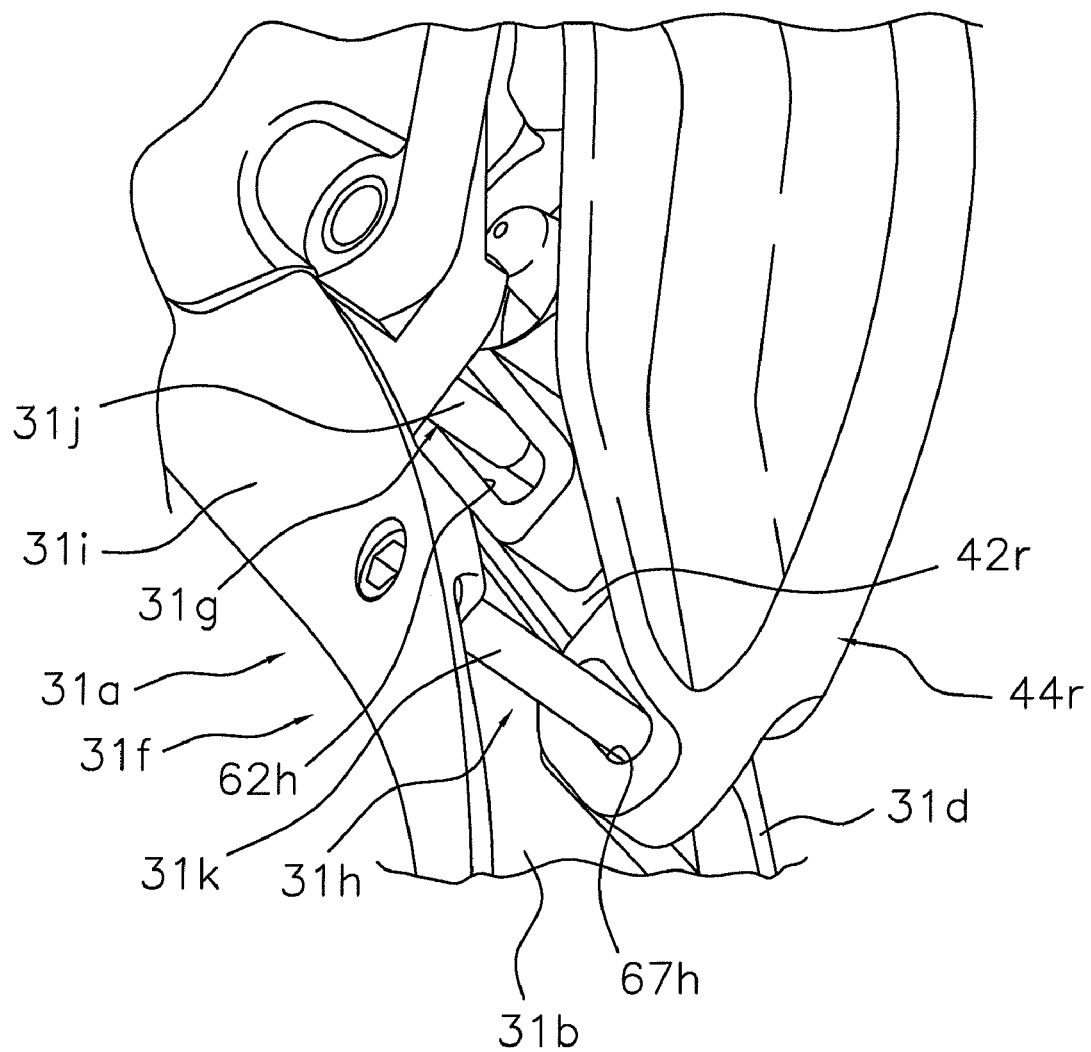
FIG. 8 is an enlarged perspective view of a distal end portion of the gearshift operating part.

The brake lever 31f is connected to the brake bracket 30f such that it can pivot freely about a lever shaft 33f arranged from left to right on a lower frontal portion of the brake bracket 30f. The brake lever 31f is connected to one end of a Bowden-type brake cable (not shown) on the inside of the brake bracket 30f. The other end of the brake cable is connected to the front brake 107f. The brake lever 31f has a lever operating part 31a that extends downward from a support portion where it is supported by the lever shaft 33f. The lever operating part 31a has a side wall 31d having a cut-away section 31c positioned in a middle portion along the lengthwise dimension of the lever operating part 31a. At least a portion of the rear derailleur operating unit 32r is arranged inside the cut-away section 31c. A first guide section 31g is provided in a distal end portion of the lever operating part 31a. The first guide section 31g is configured to guide a first gearshift operating part 42r (described later) in a movement direction. A second guide section 31g is provided in a position of the lever operating part 31a that is farther toward the distal end of the lever operating part 31a than the first guide section 31g. The second guide section 31g is configured to guide the second gearshift operating part 44r in a movement direction. As shown in FIG. 8, the first guide section 31g has a first guide shaft 31j that is supported in a cantilever fashion on a side wall 31i located on the opposite side of the lever operating part 31a as the side wall 31d in which the cut-away section 31c is formed. The first guide shaft 31j is arranged to extend toward the side wall 31d. The second guide section 31h has a second guide shaft 31k arranged to be supported at both ends on the side walls 31d and 31i.

Figure 9:
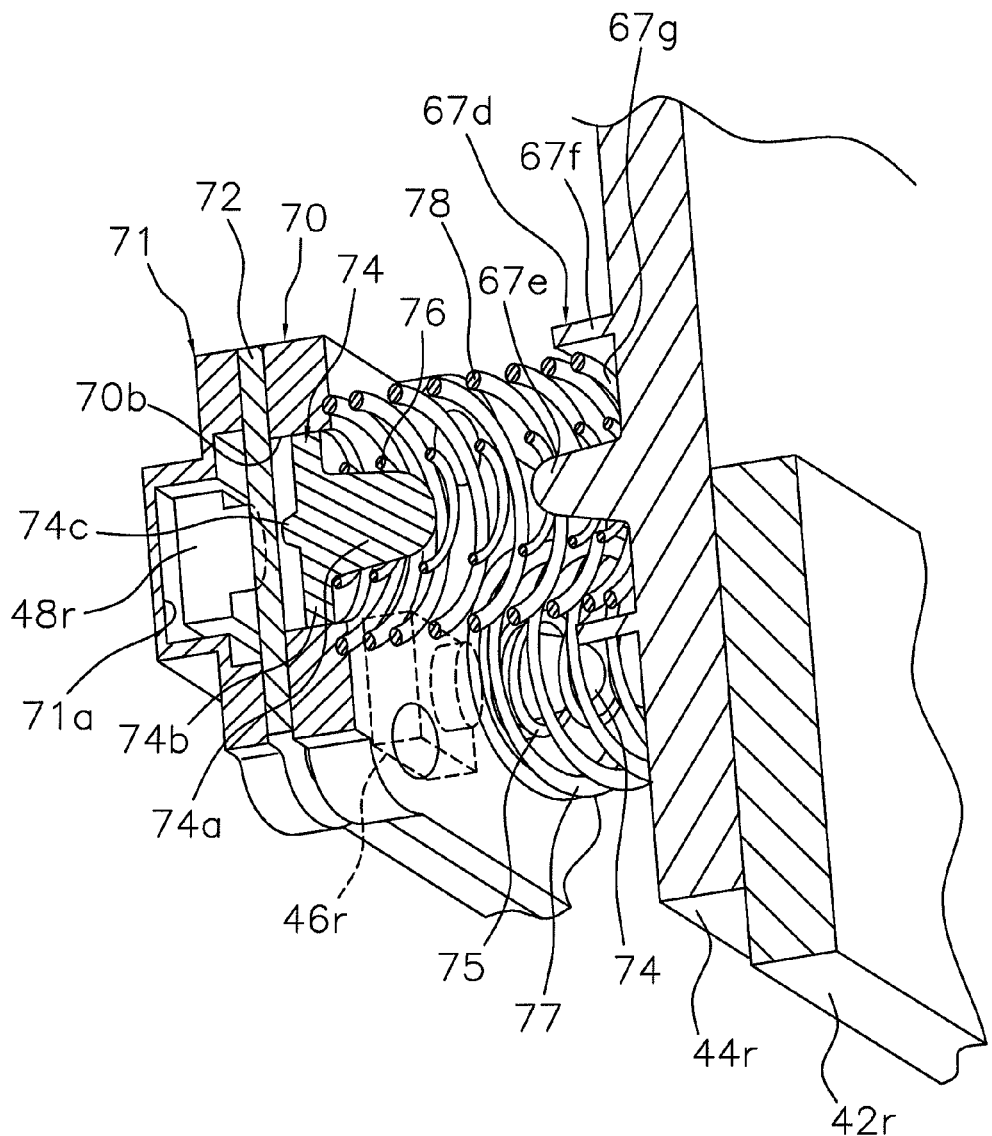
FIG. 9 is a perspective cross sectional view of a switch mounting unit.
Figure 10:
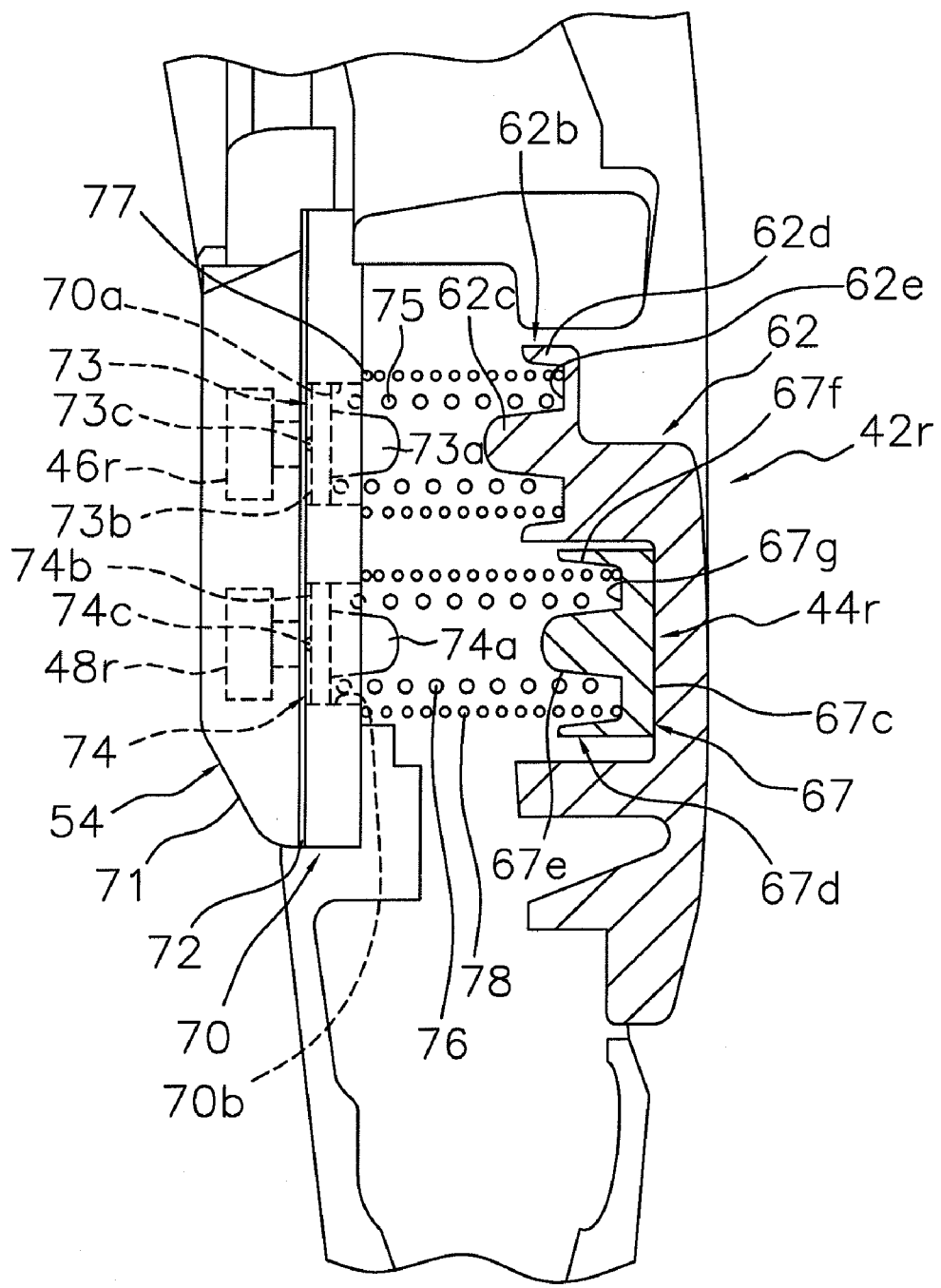
FIG. 10 is a cross sectional view of a vicinity of a switch mounting unit.

As shown in FIGS. 4 to 11, the rear derailleur operating unit 32r comprises a first gearshift operating part 42r, a second gearshift operating part 44r, a first electrical switch 46r (see FIGS. 9 and 10) and a second electrical switch 48r (see FIGS. 9 and 10). The first gearshift operating part 42r is movable relative to the brake lever 31f. The second gearshift operating part 44r is movable relative to the brake lever 31f. The second gearshift operating part 44r is separate from the first gearshift operating part 42r. The first electrical switch 46r is operated with the first gearshift operating part 42r. The second electrical switch 48r is operated with the second gearshift operating part 44r. The first and second gearshift operating parts 42r and 44r are pivotally mounted to a back surface 31b of the brake lever 31f. The first and second electrical switches 46r and 48r are mounted together in a switch mounting unit 54 on the side wall 31i of the brake lever 31f.

Figure 5:
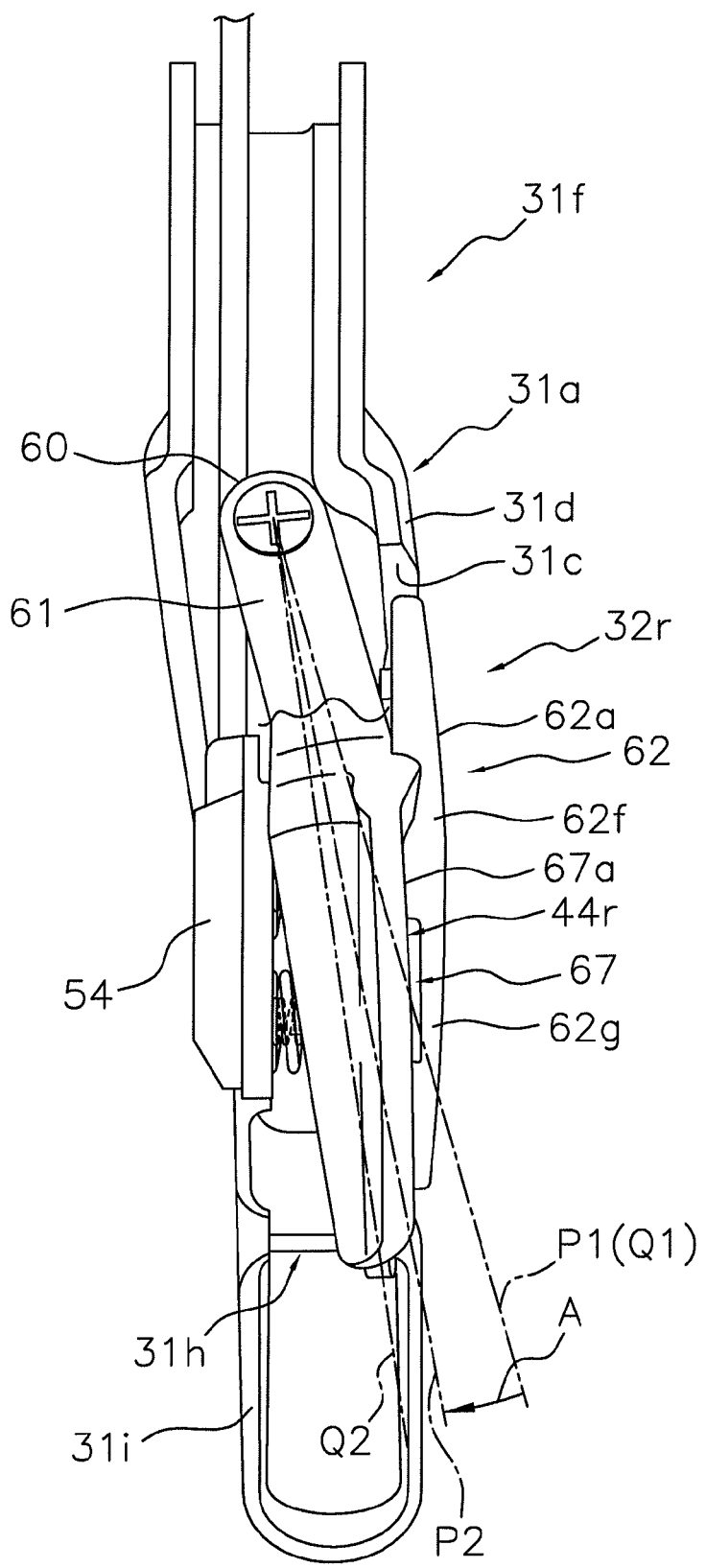
FIG. 5 is an enlarged rear elevational view of the rear derailleur operating unit on the lever operating part of the front brake lever.

The first gearshift operating part 42r is a generally plate-like member made of a synthetic resin material and is used to operate the rear derailleur 97r in the upshift direction. As shown in FIG. 5, the first gearshift operating part 42r can be pivoted from a first rest position P1 toward the middle of the handlebar 112, i.e., toward the inward side of the brake lever 31f in the direction indicated by the arrow A in FIG. 5. A first operating position P2, where the first electrical switch 46r is actuated, is located on the inward side of the first rest position P1. The first gearshift operating part 42r can be pivoted inwardly beyond the first operating position P2.

Figure 6:
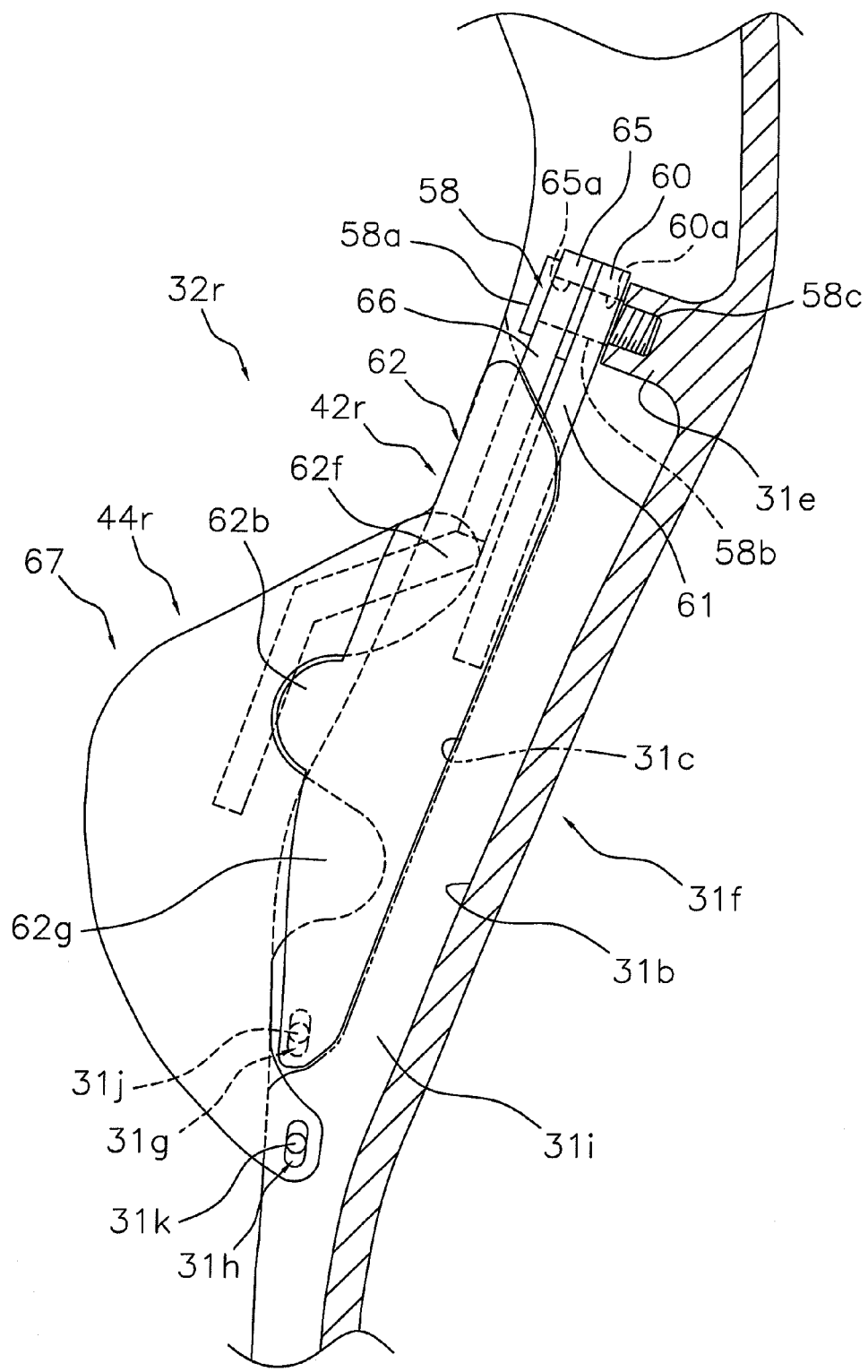
FIG. 6 is a cross sectional view of leftward facing cross section of the rear derailleur operating unit on the lever operating part of the front brake lever.
Figure 7:
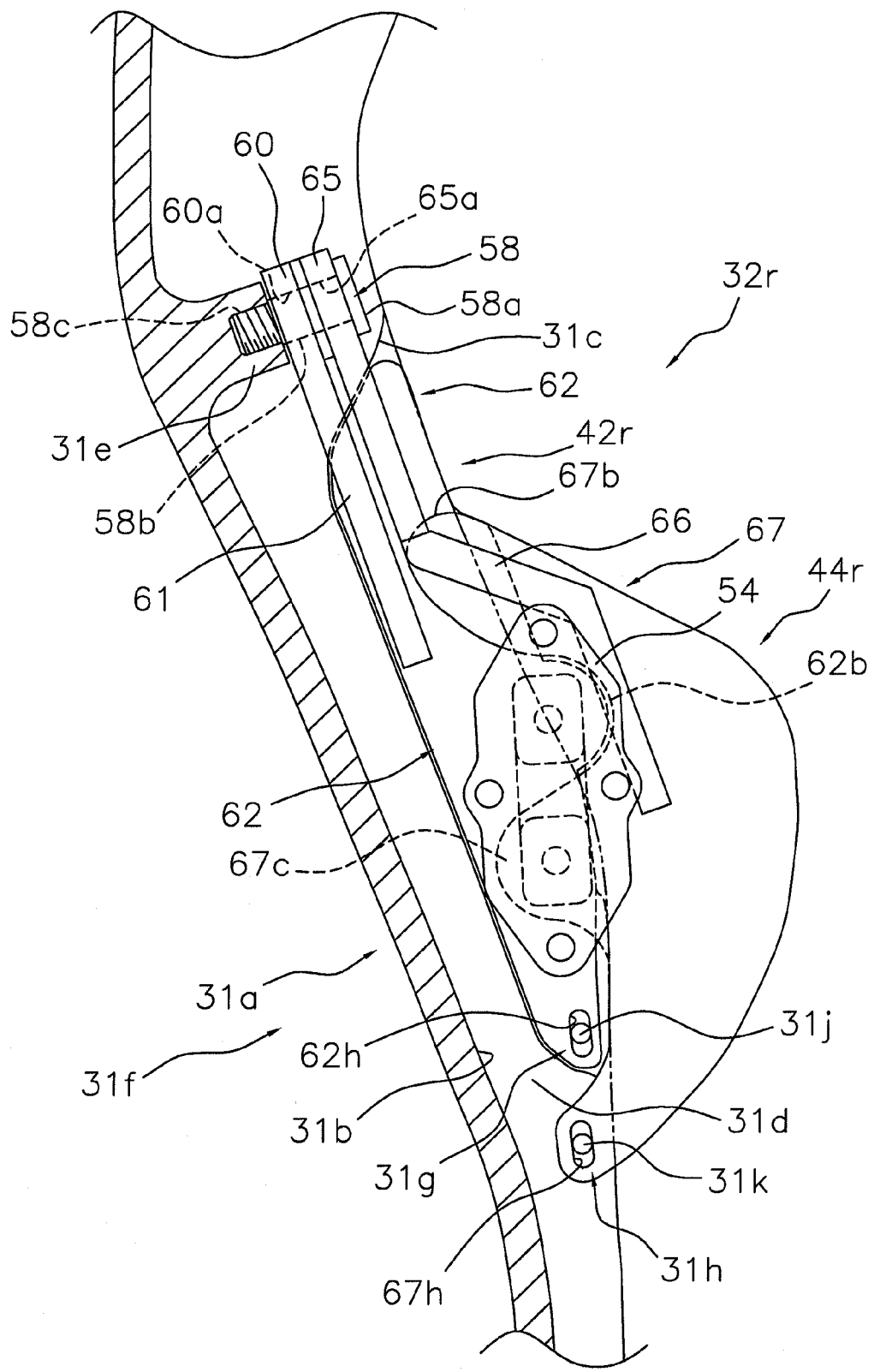
FIG. 7 is a cross sectional view of rightward facing cross section of the rear derailleur operating unit on the lever operating part of the front brake lever.

As shown in FIGS. 6 and 7, the first gearshift operating part 42r has a first mounting part 60, a first arm part 61 and a first operating part 62. The first mounting part 60 is mounted on a pivot shaft 58. The first arm part 61 extends in a radial direction from the first mounting part 60. The first operating part 62 is arranged to intersect with a distal end portion of the first arm part 61 at an angle of approximately 90 degrees. A first support hole 60a is formed in the first mounting part 60 for the pivot shaft 58 to pass therethrough. The pivot shaft 58 is screwed into a threaded boss part 31e formed on the back surface 31b of the brake lever 31f. The pivot shaft 58 has a large diameter flange part 58a, a shaft part 58b and an externally threaded part 58c. The shaft part 58b fits snugly into the first support hole 60a. The externally threaded part 58c is formed on a distal end portion of the shaft part 58b. The externally threaded part 58c has a smaller diameter than the shaft part 58b.

As shown in FIG. 5, when the first gearshift operating part 42r is in the rest position P1, the first arm part 61 contacts an inward surface of the side wall 31d of the brake lever 31f at a portion where the cut-away section 31c is formed in the side wall 31d. Thus, the rest position P1 of the first gearshift operating part 42r, i.e., the movement endpoint of the first gearshift operating part 42r in the outward direction, is determined by this contact.

As shown in FIGS. 6 and 7, the first operating part 62 is arranged inside the cut-away section 31c of the side wall 31d of the brake lever 31f. The first operating part 62 has a first operating surface 62a that is formed as a rough surface. A first switch actuating part 62b configured to protrude rearward (leftward in FIG. 6) in a semicircular shape and extend inward is formed on an intermediate portion along the lengthwise dimension of the first operating part 62. As shown in FIG. 10, the switch actuating part 62b has a first spring holder 62c that protrudes inward, a second spring holder 62d configured to protrude in an annular shape around the outside of the first spring holder 62c, and a flat plate-like spring retainer 62e arranged and configured to join the two spring holders 62c and 62d. The first switch actuating part 62b abuts against one end of a first spring member 75 and one end of a third spring member 77 (described later).

As shown in FIGS. 5 to 7, two pressing parts 62f and 62g configured such that they can press against the second gearshift operating part 44r are arranged on both lengthwise sides of the first switch actuating part 62b. The pressing parts 62f and 62g are formed thinner than other portions and are arranged and configured such that the second gearshift operating part 44r enters into the inside thereof (left side in FIG. 7).

As shown in FIG. 8, an elongated hole 62h configured to be guided by the first guide shaft 31j of the brake lever 31f is formed in a distal end portion of the first operating part 62. The inward movement end position P3 (FIG. 11) of the first gearshift operating part 42r is determined by contact of an inward surface of a portion of the first operating part 62 where the elongated hole 62h is formed against a portion of the side wall 31i where the first guide shaft 31j is mounted.

Figure 12:
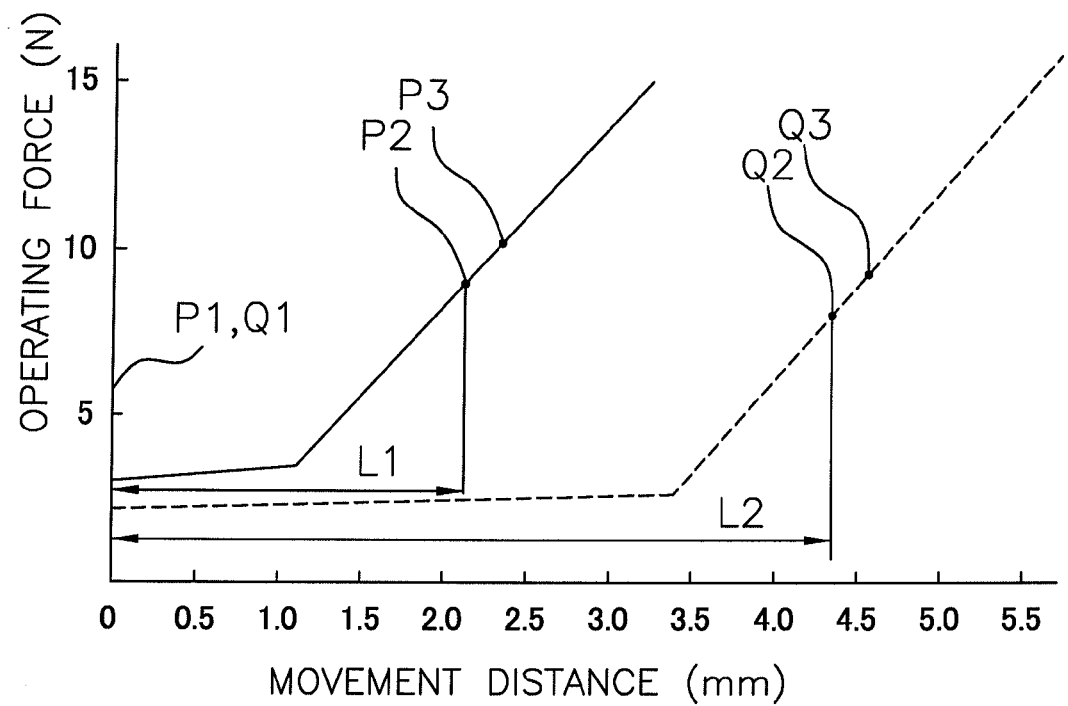
FIG. 12 is a graph plotting the operating force versus the movement distance for the gearshift operating parts.

The second gearshift operating part 44r is a generally plate-like member made of a metal material. The second gearshift operating part 44r is used to operate the rear derailleur 97r in the downshift direction. As shown in FIG. 5, the second gearshift operating part 44r can be pivoted from a second rest position Q1 toward the middle of the handlebar 112, i.e., toward the inward side of the brake lever 31f. A second operating position Q2 where the second electrical switch 48r is actuated is located on the inward side of the second rest position Q1. The second gearshift operating part 44r can be pivoted inwardly beyond the second operating position Q2. As shown in FIG. 12, the movement distance L1 from the first rest position P1 to the first operating position P2 is shorter than the distance L2 from the second rest position Q1 to the second operating position Q2.

When the first gearshift operating part 42r is moved inward relative to the brake lever 31f, the second gearshift operating part 44r moves inward relative to the brake lever 31f together with the first gearshift operating part 42r. Conversely, when the second gearshift operating part 44r is moved inward relative to the brake lever 31f, the first gearshift operating part 42r does not move inward. Since the movement distance L1 of the first gearshift operating part 42r is shorter than the movement distance L2 of the second gearshift operating part 44r, the second electrical switch 48r is not actuated when the second gearshift operating part 44r moves inward as a result of the first gearshift operating part 42r being operated.

The second gearshift operating part 44r has a second mounting part 65, a second arm part 66 and a second operating part 67. The second mounting part 65 is supported on the pivot shaft 58. The second arm part 66 extends in a radial direction from the second mounting part 65. The second operating part 67 is arranged to intersect with a distal end portion of the second arm part 66 at an angle of approximately 90 degrees.

A second support hole 65a is formed in the second mounting part 65 for the pivot shaft 58 to pass there-through. The shaft part 58b of the pivot shaft 58 fits snugly into the support hole 65a. Since the first gearshift operating part 42r and the second gearshift operating part 44r are both pivotally mounted to the same pivot shaft 58, both members pivot about the same (single) axis.

As shown in FIG. 5, the second arm part 66 is in the same position as the first arm part 61 when the second gearshift operating part 44r is in the second rest position Q1. Thus, the second rest position Q1 is the movement endpoint of the second gearshift operating part 44r in the outward direction. The second arm part 66 extends in a radial direction from the second mounting part 65 in a position rearward of the first arm part 61.

As shown in FIGS. 5 to 7, the second operating part 67 is arranged rearward (leftward in FIG. 6) of the first operating part 62. A second operating surface 67a is formed on an outward face of the second operating part 67. The second operating surface 67a is a smooth surface without roughness or bumpiness such that it can be distinguished from the first operating surface 62a by the sense of touch (difference in texture). When the gearshift operating parts 42r and 44r are both in the rest position P1 and Q1, the second operating surface 67a is arranged in a different plane than the first operating surface 62a (FIG. 5). More specifically, the second operating surface 67a is arranged slightly further inward (leftward in FIG. 5) than the first operating surface 62a. Thus, the first gearshift operating part 42r and the second gearshift operating part 44r can be distinguished based on both the difference in texture and the difference in arrangement, enabling unintended gear shift operations to be prevented in a reliable fashion.

Pressure receiving parts 67b and 67c are provided on an upper end portion and an intermediate portion, respectively, along the lengthwise direction of the second operating part 67. The pressure receiving parts 67b and 67c arranged and configured to protrude in a forward direction (leftward in FIG. 7). The pressure receiving parts 67b and 67c are provided in positions where they can contact the pressing parts 62f and 62g of the first operating part 62. The pressure receiving parts 67b and 67c are contacted and pressed by the pressing parts 62f and 62g when the first gearshift operating part 42r is pivoted from the first rest position P1. As a result, the second gearshift operating part 44r is pivoted in unison when the first gearshift operating part 42r is pivoted.

As shown in FIG. 10, a second switch actuating part 67d is formed on an inward surface of the pressure receiving part 67c and extends inwardly. Similarly to the first switch actuating part 62b, the second switch actuating part 67d has a third spring holder 67e, a fourth spring holder 67f, and a flat plate-like spring retainer 67g. The third spring holder 67e protrudes inward. The fourth spring holder 67f protrudes in an annular shape around the outside of the third spring holder 67f. The flat plate-like spring retainer joins the two spring holders 67e and 67f. The second switch actuating part 67d abuts against one end of a second spring member 76 and one end of a fourth spring member 78 (described later). Between the pressure receiving parts 67b and 67c, the first switch actuating part 62b is deeply recessed in a substantially semicircular shape such that it can face opposite the first electrical switch 46r.

As shown in FIG. 8, an elongated hole 67h is formed in a distal end portion of the second operating part 67 to be guided by the second guide shaft 31k of the brake lever 31f. The inward movement end position Q3 of the second gearshift operating part 42r is determined by contact of an inward surface of a portion of the second operating part 67 where the elongated hole 67h is formed against a portion of the side wall 31i where the second guide shaft 31k is mounted.

As shown in FIGS. 9 and 10, the switch mounting unit 54 is arranged in such a position as to face the first and second switch actuating parts 62b and 67d of the first and second operating parts 62 and 67 of the first and second gearshift operating parts 42r and 44r. The switch mounting unit 54 includes a switch bracket 70, a switch housing part 71, a water-resistant sheet packing 72 and first and second switch systems 73 and 74. The switch bracket 70 is screw fastened to the side wall 31 of the lever operating part 31a of the brake lever 31f. The switch housing part 71 separately encloses the first and second electrical switches 46r and 48r (which are tactile switches). The water-resistant sheet packing 72 seals the switch housing part 71. The first and second switch systems 73 and 74 are movably arranged on the switch bracket 70 with the sheet packing 72 sandwiched in between. The switch bracket 70 has an outside shape similar to that of the switch housing part 71. The switch housing 70 is, for example, screw fastened to the switch bracket 70. The switch housing part 71 has a housing recess 71a in which the first and second electrical switches 46r and 48r are housed.

The first and second switch systems 73 and 74 are provided as a pair for the purpose of operating (actuating) the first and second electrical switches 46r and 48r, respectively. The first and second switch systems 73 and 74 are arranged in guide holes 70a and 70b, respectively, of the switch bracket 70 such that they can move toward and away from the first and second electrical switches 46r and 48r. The first switch system 73 comprises a rod-like part 73a, a large diameter flange part 73b and a switch pressing part 73c. The large diameter flange part 73b is formed integrally on one end of the rod-like part 73a. The switch pressing part 73c protrudes toward the sheet packing 72 from the center of the flange part 73b. Similarly, the second switch system 74 comprises a rod-like part 74a, a large diameter flange part 74b and a switch pressing part 74c. The large diameter flange part 74b is formed integrally on one end of the rod-like part 74a. The switch pressing part 74c protrudes toward the sheet packing 72 from the center of the flange part 74b. A first spring member 75 is arranged between the flange part 73b of the first switch system 73 and the first switch actuating part 62b. A second spring member 76 is arranged between the flange part 74b of the second switch system 74 and the second switch actuating part 67d. The first and second spring members 75 and 76 are provided in the form of coil springs and function in operating the switches. Each of the first and second spring members 75 and 76 is arranged around the outside circumference of the corresponding rod like part 73a or 74a of the switch systems 73 and 74 in a free state in which it is neither compressed nor stretched. A third spring member 77 is arranged between the first switch actuating part 62b and the switch bracket 70, and a fourth spring member 78 is arranged between the second switch actuating part 67d and the switch bracket 70. The third and fourth spring members 77 and 78 are provided in the form of coil springs and arranged and configured to be positioned radially to the outside of the respective flange parts 73a and 74a. The third and fourth springs 77 and 78 exert forces serving to return the first and second gearshift operating parts 42r and 44r to the first and second rest positions P1 and Q1, respectively. The third spring member 77 is arranged around the outside of the first spring member 75 so as to be coaxial with respect to the first spring member and in a compressed state. Similarly, the fourth spring member 78 is arranged around the outside of the second spring member 76 so as to be coaxial with respect to the second spring 76 and in a compressed state. The first spring member 75 is arranged between the first switch actuating part 62b and the flange part 73b such that a gap exists between the spring member 75 and the parts 62b and 73b. Similarly, the second spring member 76 is arranged between the second switch actuating part 67d and the flange part 74b such that a gap exists. More specifically, as shown in FIG. 12, the first spring member 75 is arranged with a gap of 1.2 mm and the second spring member 76 is arranged with a gap of 3.4 mm such that the total movement distance includes a region of play in which the rate at which the operating force increases with respect to movement of the switch actuating part 62b or 67d is small.

The first and second spring members 75 and 76 for actuating the switches have larger spring coefficients than the third and fourth spring members 77 and 78 for returning the switch actuating parts 62b and 67d to their original positions. For example, the coil spring wire diameter of the first and second spring members 75 and 76 is larger and the number of windings is smaller than the third and fourth spring members 77 and 78. This aspect is not depicted accurately in FIG. 9. The free lengths of the first and third spring members 75 and 77 are shorter than the free lengths of the second and fourth spring members 76 and 78.

The existence of first spring member 75 between the first gearshift operating part 42r and the first electrical switch 46r enables the first gearshift operating part 42r to be pivoted, i.e., over stroked, beyond the first operating position P2 after the first electrical switch 46r has been turned on by operating the first gearshift operating part 42r. Similarly, the existence of the second spring member 76 between the second gearshift operating part 44r and the second electrical switch 48r enables the second gearshift operating part 44r to be pivoted beyond the second operating position Q2 after the second electrical switch 48r has been turned on by operating the second gearshift operating part 44r. As a result, the gear shift operation can be executed comfortably without the feeling of a sudden stop of the pivot motion. The third spring member 77 acts to return the first gearshift operating part 42r to the first rest position P1 after a gear shift operation, and the fourth spring member 78 acts to return the second gearshift operating part 44r to the second rest position Q1 after a gear shift operation. In order to provide a difference in feeling between operation of the first gearshift operating part 42r during upshifting and operation of the second gearshift operating part 44r during downshifting, it is acceptable to configure the third spring member 77 for returning the first gearshift operating part 42r to have a larger spring constant (stronger spring force) than the fourth spring member 78 for returning the second gearshift operating part 44r.

Figure 3:
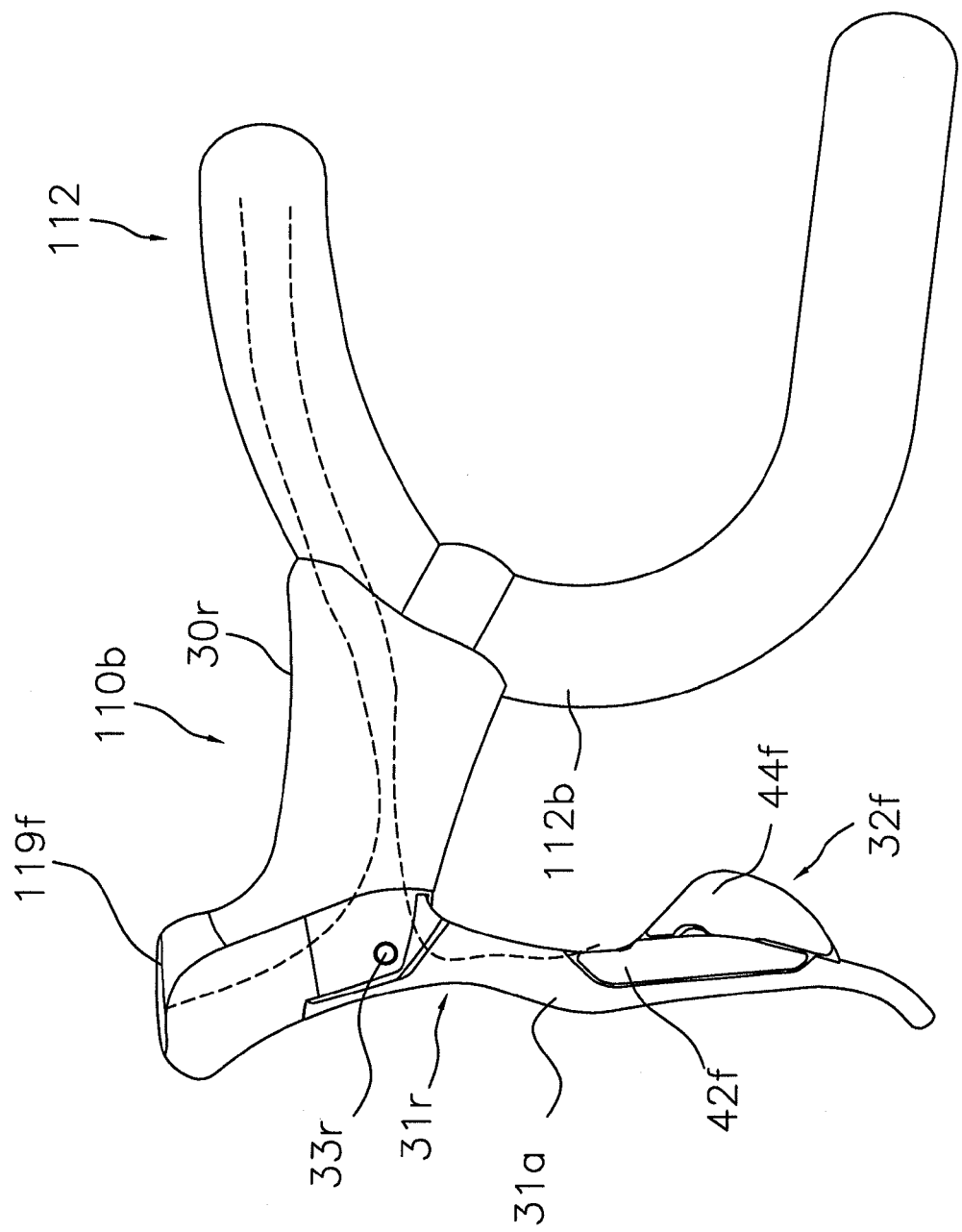
FIG. 3 is an enlarged side elevational view of the bicycle (brake/derailleur) control device for operating the rear brake of the bicycle.
Figure 4:
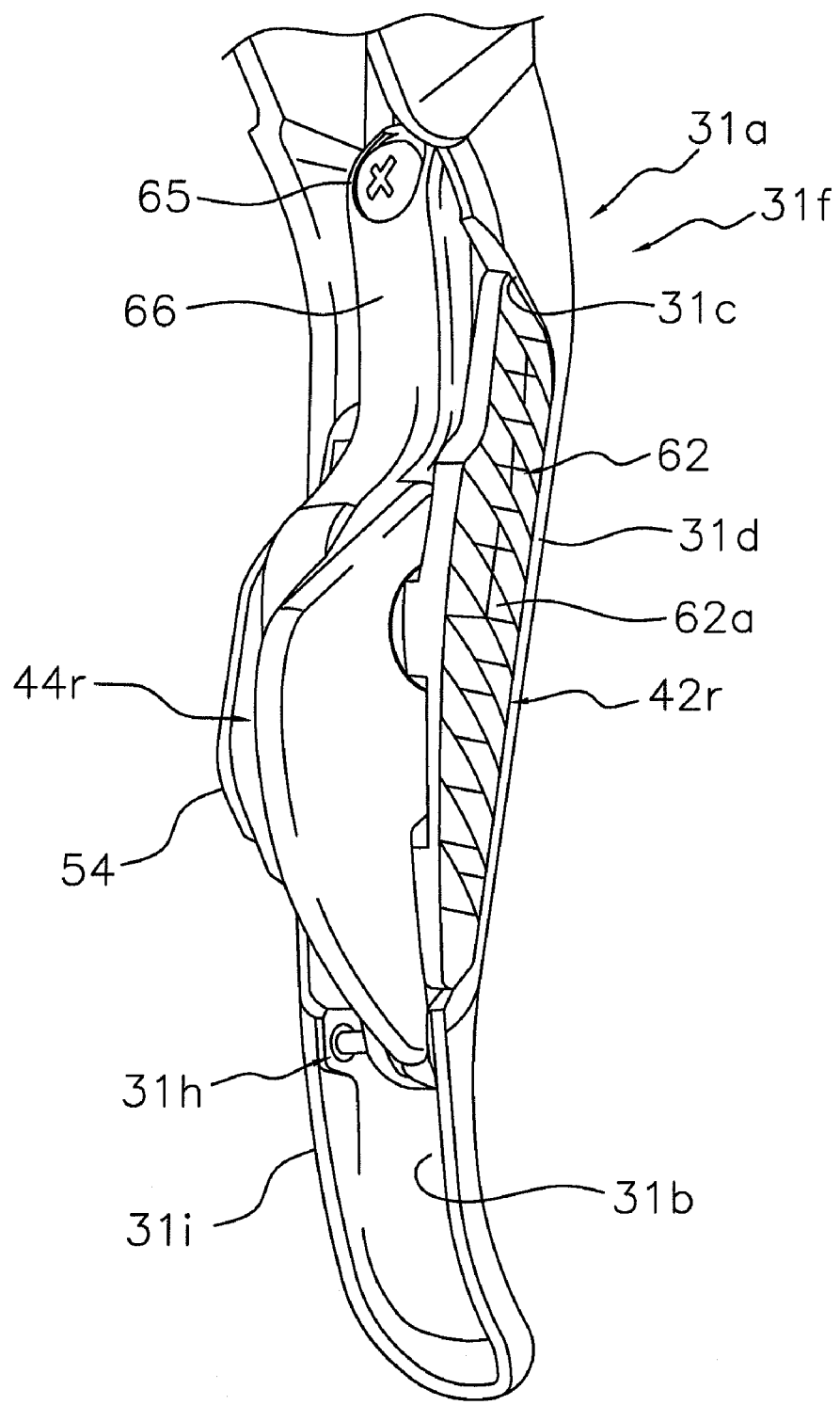
FIG. 4 is an enlarged rear perspective view of the rear derailleur operating unit on the lever operating part of the front brake lever.

The control device 110b is mirror symmetrical to the control device 110a. As shown in FIG. 3, the control device 110b has a brake bracket 30r and a front derailleur operating unit 32f. The brake lever 31r operates the rear brake 107r, while the front derailleur operating unit 32f operates the front derailleur 97f so as to change gears.

Figure 13:
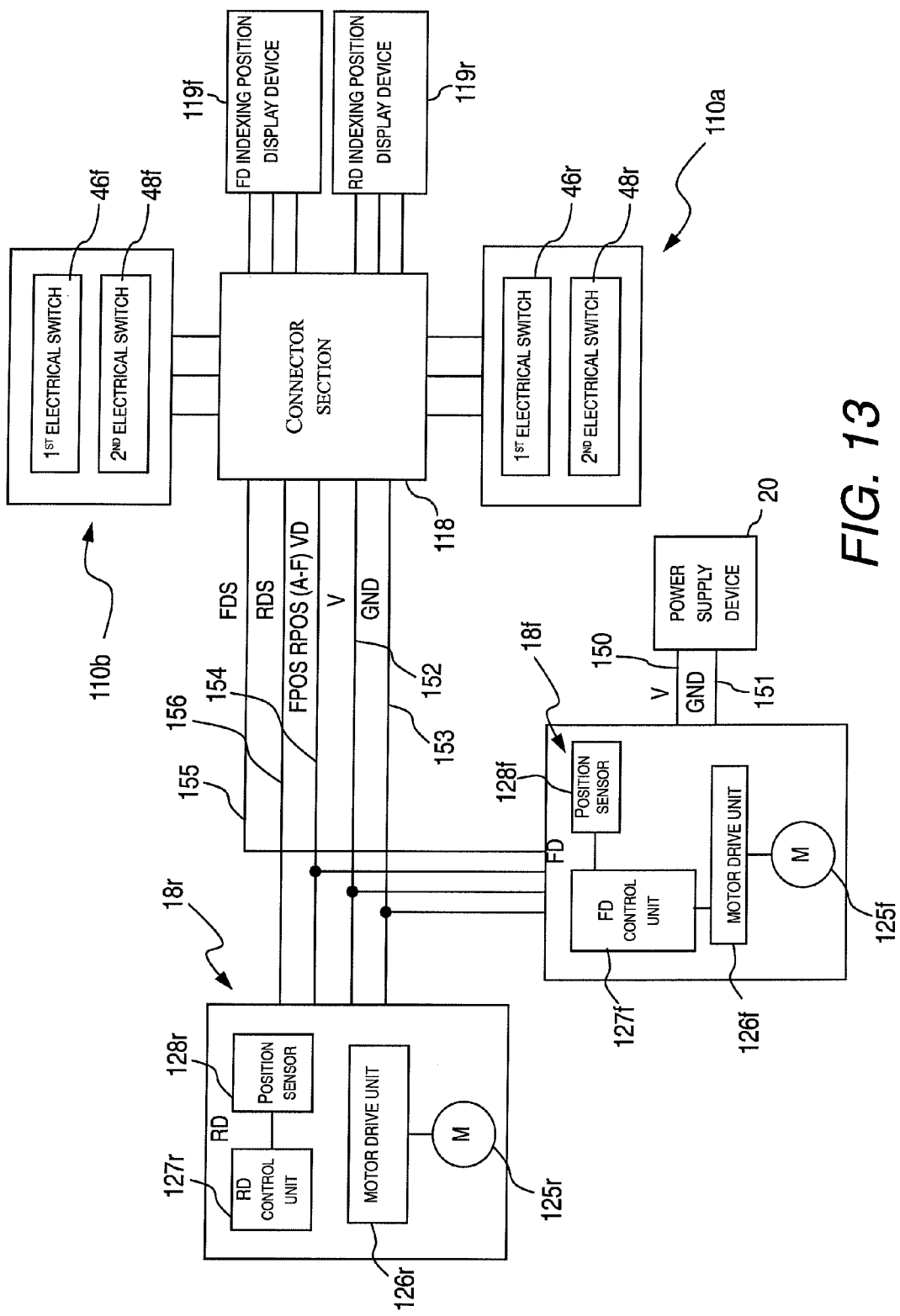
FIG. 13 is a block diagram showing the constituent components of a gear change control system.

Similarly to the rear derailleur operating unit 32r, the front derailleur operating unit 32f comprises a first gearshift operating part 42f, a second gearshift operating part 44f, a first electrical switch 46f (see FIG. 13) and a second electrical switch 48f (see FIG. 13). The first gearshift operating part 42f is mounted to a back surface of the lever operating part 31a and movably connected to the brake lever 31r. The second gearshift operating part 44f is movably connected to the brake lever 31r and is a separate entity from the first gearshift operating part 42r. The first electrical switch 46f is operated with the first gearshift operating part 42f. The second electrical switch 48f is operated with the second gearshift operating part 44f.

Figure 11:
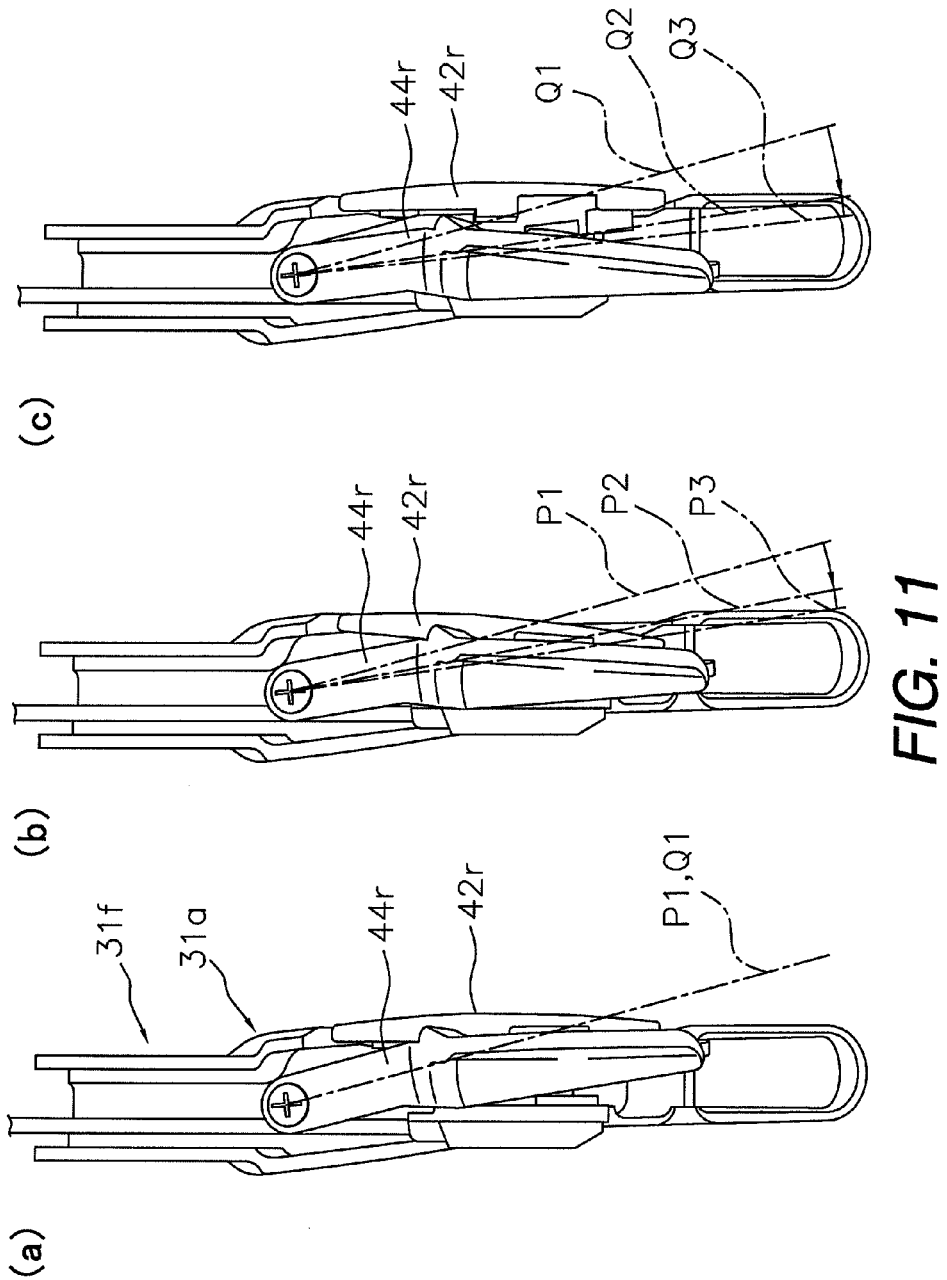
FIG. 11 is a series of rear views illustrating the operation of a gearshift operating part.

With a rear or front derailleur operating unit 32r or 32f contrived as described above, when the first gearshift operating part 42r (or 42f) is pressed (operated) inwardly from the first rest position P1 shown in part (a) of FIG. 11 with a tip of a finger (e.g., the index figure) of the right hand (or left hand in the case of 42f), first the third spring member 77 is compressed and then the first spring member 75 is compressed after contact with the first spring member 75 occurs. The first spring member 75 presses against the first switch system 73 and causes the first switch system 73 to move toward the first electrical switch 46r (or 46f). Meanwhile, the second gearshift operating part 44r (or 44f) is pressed by the first gearshift operating part 42r (or 42f) such that the second gearshift operating part 44r (or 44f) pivots from the second rest position Q1 together with the first gearshift operating part 42r (or 42f). When the first switch system 73 moves, the switch pressing part 73c of the first switch system 73 presses the first electrical switch 46r (or 46f) through the sheet packing 72. During this pressing, when the first gearshift operating part 42r (or 42f) reaches the intermediately located first operating position P2 shown in part (b) of FIG. 11, the first electrical switch 46r (or 46f) turns on and the rear derailleur 97r (or front derailleur 97f) upshifts by one gear. As shown in FIG. 11, the movement distance L2 of the second gear shifter operating member 44r (or 44f) is longer than the movement distance L1 of the first gearshift operating part 42r (42f). Thus, the second gearshift operating part 44r (or 44f) does not move to the second operating position Q2 where the second electrical switch 48r (or 48f) would turn on. Consequently, the second electrical switch 48r (or 48f) is not actuated.

At an intermediate position between the first rest position P1 and the first operating position P2, the first spring member 75 begins to be compressed in addition to the third spring member 77 and the operating force increases rapidly. The change in the operating force of the first gearshift operating part 42r (or 42f) is indicated with a solid-line curve in FIG. 12. Until the transition to a rapidly increasing operating force is reached, it is chiefly the spring force of the third spring member 77 that acts on the first gearshift operating part 42r and the first gearshift operating part 42r can be operated with a small force, i.e., with a degree of play. The operating force increases rapidly when the first spring member 75 starts to be compressed, and the first electrical switch 46r (or 46f) turns on when the first gearshift operating part 42r (or 42f) reaches the second operating position P2. As a result, the timing at which the first electrical switch 46r (or 46f) turns on after the first gearshift operating part 42r (or 42f) starts being operated can be readily recognized.

When the second gearshift operating part 44r (or 44f) is pressed (operated) inwardly from the second rest position Q1 shown in part (a) of FIG. 11, the second gearshift operating part 44r (or 44f) pivots alone independently of the first gearshift operating part 42r (or 42f). When the second gearshift operating part 44r (or 44f) reaches the second operating position Q2 shown in part (c) of FIG. 11, which is farther inward than the first operating position P2, the pressure of the second switch system 74 causes the second electrical switch 48r (or 48f) to turn on and the rear derailleur 97r (or front derailleur 97f) downshifts by one gear. Here, too, the operating force suddenly increases before the second operating position Q2 is reached. The change in the operating force of the second gearshift operating part 44r (or 44f) is indicated with a broken-line curve in FIG. 12. Similarly to the first gearshift operating part 42r (or 42f), the operating force of the second gearshift operating part 44r (or 44f) is small while only the fourth spring member 78 is compressed and increases rapidly when the second spring member 76 starts being compressed. Also similarly to the first gearshift operating part 42r (or 42f), the second operating position Q2 is reached after the rapid increase of the operating force occurs and the timing at which the second electrical switch 48r (or 48f) turns on after the second gearshift operating part 44r (or 44f) starts being operated can be readily recognized.

In FIG. 12, the movement distance (operation stroke) L2 of the second gearshift operating part 44r to the operating position Q2 is longer than the movement distance L1 of the first gearshift operating part 42r and, likewise, the second gearshift operating part 44r has a longer range of play.

Since the control device 110a executes gear change operations with two separate gearshift operating parts 42r and 44r, the movement directions of each of the gearshift operating parts 42r and 44r can be set independently. For example, both of the gearshift operating parts can be contrived such that the movement direction thereof is inward, i.e., toward the middle of the handlebar 112. Thus, two different types of gear change operation can be accomplished using only the ventral side of a finger tip.

Furthermore, since the second gearshift operating part 44r moves inward together with the first gearshift operating part 42r when the first gearshift operating part 42r is moved, the second gearshift operating part 44r can be moved in the same direction as the first gearshift operating part 42r. Consequently, even if the first gearshift operating part 42r is arranged closer to the finger tips (farther forward from the handlebar 112) than the second gearshift operating part 44r, the second gearshift operating part 44r does not impede the operation of the first gearshift operating part 42r. As a result, two difference types of gear change operation can be executed while preventing unintended gear change operations.

The control devices 110a and 110b are connected to the rear derailleur 97r and the front derailleur 97f, respectively, with electrical wiring.

As shown in FIG. 13, the electric drive unit 18f of the front derailleur 97f includes a motor 125f, a motor drive unit 126f, a front derailleur control unit 127 (FD control unit) and a position sensor 128f. The motor 125f drives the front derailleur 97f. The motor drive unit 126f drives the motor 125f. The front derailleur control unit 127 controls the motor drive unit 126f based on a signal from the control device 110b. The position sensor 128f detects the indexing position of the front derailleur 97f.

Similarly, the electric drive unit 18r of the rear derailleur 97r includes a motor 125r, a motor drive unit 126r, a rear control unit 127 (RD control unit) and a position sensor 128r. The motor 125r drives the rear derailleur 97r. The motor drive unit 126r drives the motor 125r. The rear control unit 127 controls the motor drive unit 126r based on a signal from the control device 110a. The position sensor 128r detects the indexing position of the rear derailleur 97r.

Each of the front and rear motor drive units 126f and 126r has a motor driver and a reduction unit configured to reduce the rotational speed of the respective motor 125f or 125r. Each of the front and rear control units 127f and 127r has a control circuit that includes a microcomputer having a memory unit and a processing unit and each is configured to use software to control the respective motor drive unit 126f or 126r, respectively, based on the signal outputted from the respective control device 110a or 110b. The front and rear position sensors 128f and 128r are configured to use, for example, a rotary encoder to detect the indexing position of the respective derailleur 97f or 97r.

The power supply device 20 mounted to the front derailleur 97f delivers electric power through the connector section 118 to the derailleurs 97f and 97r, the control devices 110a and 110, and the front and rear indexing position display devices 119f and 119r. More specifically, direct current power supply voltage V of 6 to 8.4 volts is supplied from the power supply device 20 to the electric drive unit 18f of the front derailleur 97f through a power supply line 150 and a ground line 151. In turn, the power supply voltage V is supplied from the electric drive unit 18f to the electric drive unit 18r of the rear derailleur 97r through a power supply line 152 and a ground line 153.

The power supply voltage V is supplied to the indexing position display devices 119f and 119r and the front and rear derailleur operating devices 110a and 110b through the connector section 118. The front and rear position sensors 128f and 128r issue indexing position signals FPOS and RPOS to the front and rear indexing position display devices 119f and 119r, respectively, through a position signal line 154 and the connector section 118. The indexing position display devices 119f and 119r display the indexing positions of the front and rear derailleurs 97f and 97r. Meanwhile, indexing signals FDS and RDS are generated in response to operation of the control devices 110a and 110b and issued to the front and rear derailleurs 97f and 97r through the connector section 118 and indexing signal lines 155 and 156, respectively. The indexing signal line 156 for the indexing signal RDS is actually connected to the electric drive unit 18r through the electric drive unit 18f. The electric drive unit 18f of the front derailleur 97f is connected to the connector section 118 with a five-core wire passed through, for example, the down tube 102c, and the electric drive unit 18r is connected to the electric drive unit 18f with a four-core wire passed through, for example, the chain stay 102d. Therefore, it is acceptable to provide the electric drive unit 18f with a connector for connecting the five wires of the five-core wire collectively.

Although the preceding embodiment presents a derailleur (externally mounted gear changer) as an example of a gear changer device, the present invention can also be applied to a brake and gear changer operating device contrived to operate an internally installed gear changer device that has a plurality of indexing positions and can be electrically controlled.

Although in the preceding embodiment the first gearshift operating part 42r and the second gearshift operating part 44r are connected to the brake lever 31f such that they pivot about the same pivot shaft 58, it is acceptable to connect them such that they pivot about separate pivot shafts. It is also acceptable to connect the gearshift operating parts 42r and 44r to the brake lever 31f such that they move in a fashion other than a pivoting fashion, e.g., a sliding fashion.

Although the preceding embodiment illustrates a case in which indexing by one position can be executed with a signal shift operation, the present invention can also be applied to a brake and gear changer operating device configured to execute indexing by two or more positions with a signal shift operation. In such a case, the operating device can be configured to index the gear changer through a plurality of positions by executing a special shift operation, such as pressing the operating device for a longer period of time or double clicking the operating device.

In the preceding embodiment, the first and second gearshift operating parts 42r and 44r are mounted directly to the brake lever 31f. However, it is acceptable for the first and second gearshift operating parts 42r and 44r to be mounted to either the brake lever 31f or the brake bracket 30f with a separate mounting member.

In the preceding embodiment, springs are used to operate the electrical switches in order to provide a degree of over stroke so as to improve the operating feel of the gear changer operating device. However, it is acceptable to contrive the gear changer operating device such that the gearshift operating part operates the electrical switch (i.e., turns it on and off) directly. In such a case, it is preferable for the gap between the first gearshift operating part and the first electrical switch to be smaller than the gap between the second gearshift operating part and the second electrical switch.

Although in the preceding embodiment the movement distances of the two gearshift operating parts are different in order to prevent unintended operations, it is acceptable for both movement distances to be the same. In such a case, a control like that shown in FIG. 14 can be executed with a front control unit, a rear control unit, or other gear change control unit in order to prevent unintended gear change operations.

Figure 14:
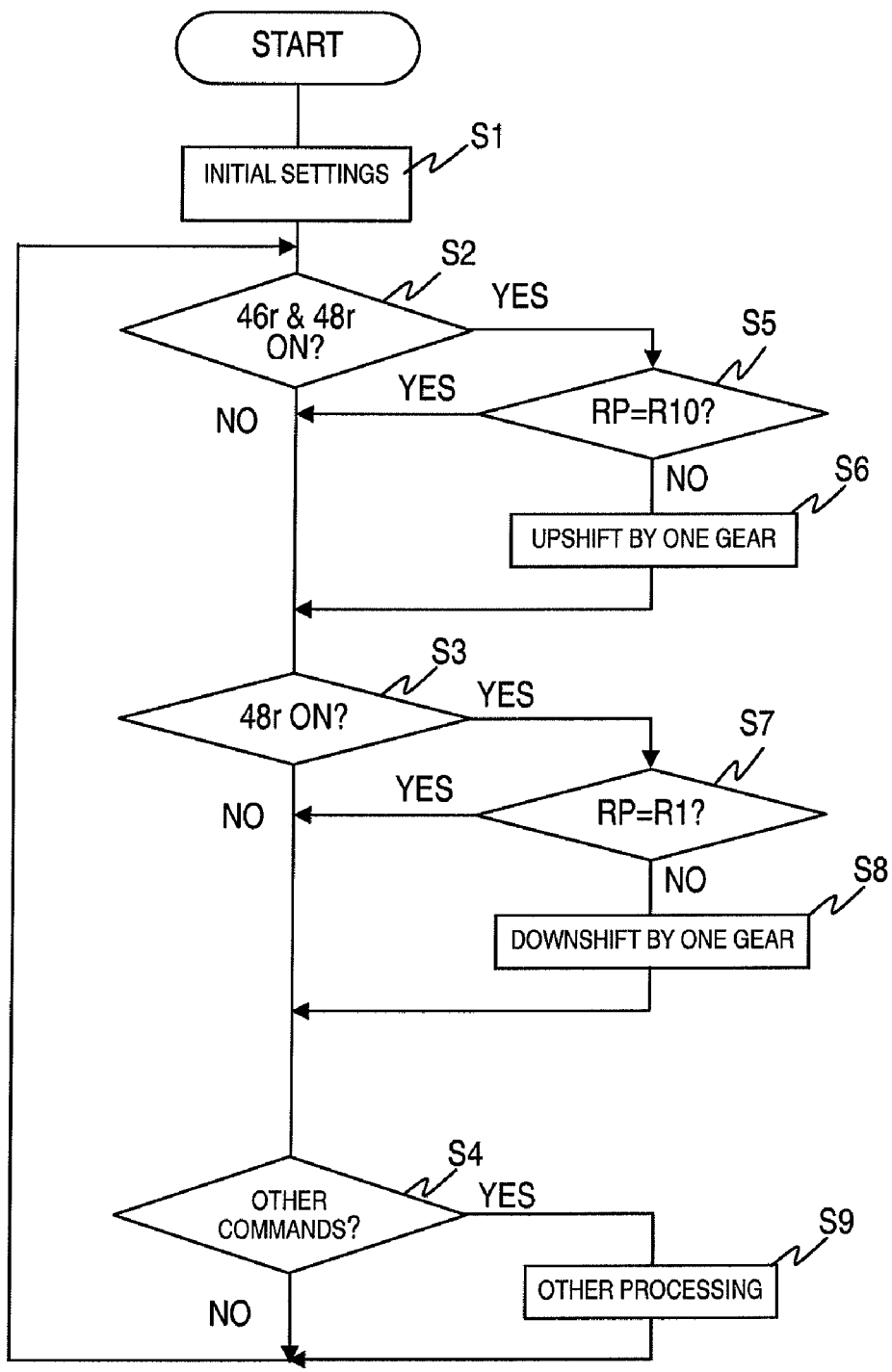
FIG. 14 is a control flowchart for another embodiment.

In FIG. 14, when the electric power supply to the gear change control unit is turned on, the gear change control unit initializes itself in step S1. Various variables and timers are set in the initialization. In step S2, the control unit determines if both electrical switches 46r and 48r are on. When the movement distances of the two gearshift operating parts are the same, both of the electrical switches 46r and 48r will turn on when the first gearshift operating part 42r is operated. In step S3, the control unit determines if only the second electrical switch 48r has turned on. In step S4, the control unit determines if any other command, e.g., a display command, has been issued. When this determination is finished, the control unit returns to step S2. If it determines that the first and second electrical switches 46r and 48f are on, then the control unit proceeds to step S5 and determines if the rear derailleur 97r is in the top position (R=10). If the rear derailleur 97r is in the top position, then the control unit proceeds directly to step S3 and skips step S6. If the rear derailleur 97r is not in the top position, then the control unit proceeds to step S6 and upshifts the rear derailleur 97r by one position before proceeding to step S3.

If only the second electrical switch 48r is on, then the control unit proceeds from step S3 to step S7. In step S7, the control unit determines if the rear derailleur 97r is in the low position (R=1). If so, then the control unit proceeds to step S4 and skips step S8. If the rear derailleur 97r is not in the low position, then the control unit proceeds to step S8 and downshifts the rear derailleur 97r by one position. If another command has been issued, then the control unit proceeds from step S4 to step S9 and executes the corresponding processing before returning to step S2.

In this way, two gearshift operating parts (gearshift operating parts) having the same movement distance can be used by employing software to determine the states of the electrical switches.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, when such directional terms as "vertical," "upper" and "lower," "longitudinal," "front" and "rear," and "left" and "right" are used regarding a part, they refer to said directions as they apply to the part when the part is installed on a bicycle. The terms "left" and "right" refer to the left and right sides or left and right directions of the bicycle when the bicycle is viewed from the rear. Accordingly, these directional terms, as utilized to describe the present invention should be interpreted relative to a bicycle equipped with the control devices of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
    a brake bracket configured to be mounted to a handlebar;
    a brake lever pivotally mounted to the brake bracket;
    a first gearshift operating part movably arranged and configured to move relative to the brake lever in a first shift operating direction during a first gearshift operation of the bicycle control device using the first gearshift operating part;
    a second gearshift operating part that is separate from the first gearshift operating part and movably arranged and configured to move relative to the brake lever during a second gearshift operation of the bicycle control device using the second gearshift operating part;
    a first electrical switch operated with the first gearshift operating part; and
    a second electrical switch operated with the second gearshift operating part,
    the second gearshift operating part being arranged such that the first gearshift operating part is moved relative to the brake lever in the first shift operating direction during the first gearshift operation of the bicycle control device using the first gearshift operating part, the second gearshift operating part also moves relative to the brake lever along with the first gearshift operating part.

2. The bicycle control device as recited in claim 1, wherein the first gearshift operating part is arranged such that when the second gearshift operating part is moved relative to the brake lever, the first gearshift operating part does not move relative to the brake lever.

3. The bicycle control device as recited in claim 1, wherein the first gearshift operating part has a contacting part that presses against the second gearshift operating part when the first gearshift operating part is moved relative to the brake lever.

4. The bicycle control device as recited in claim 1, wherein the first gearshift operating part is movable from a first rest position to a first operating position by a first movement distance where the first electrical switch is actuated, the second gearshift operating part is movable from a second rest position to a second operating position by a second movement distance where the second electrical switch is actuated, with the first movement distance of the first gearshift operating part being shorter than the second movement distance of the second gearshift operating part.

5. The bicycle control device as recited in claim 1, wherein the first gearshift operating part has a first operating surface for executing the first gearshift operation; and
the second gearshift operating part has a second operating surface arranged in proximity to the first operating surface.

6. The bicycle control device as recited in claim 1, wherein the brake lever has a side wall having a cut-away portion; and
at least a portion of the first gearshift operating part is arranged inside the cut-away portion.

7. The bicycle control device as recited in claim 1, wherein the first and second gearshift operating parts are pivotally arranged with respect to the brake lever with the first and second gearshift operating parts being pivoted in same directions with respect to the brake lever when a gear shift operation is performed by each of the first and second gearshift operating parts.

8. The bicycle control device as recited in claim 7, wherein the first and second gearshift operating parts are pivotally connected to the brake lever about a single pivot axis.

9. The bicycle control device as recited in claim 1, wherein the brake lever has a guide section that guides at least one of the first and second gearshift operating parts in a movement direction.

10. A bicycle control device comprising:
a brake bracket configured to be mounted to a handlebar;
a brake lever pivotally mounted to the brake bracket;
a first gearshift operating part movable relative to the brake lever;
a second gearshift operating part that is separate from the first gearshift operating part and movable relative to the brake lever;
a first electrical switch operated with the first gearshift operating part;
a second electrical switch operated with the second gearshift operating part;
a first spring member provided between the first gearshift operating part and the first electrical switch for actuating the first electrical switch; and
a second spring member provided between the second gearshift operating part and the second electrical switch for actuating the second electrical switch, with a free length of the first spring member being shorter than a free length of the second spring member,
the second gearshift operating part being arranged such that when the first gearshift operating part is moved relative to the brake lever, the second gearshift operating part moves relative to the brake lever along with the first gearshift operating part,
the first gearshift operating part being movable from a first rest position to a first operating position by a first movement distance where the first electrical switch is actuated, the second gearshift operating part being movable from a second rest position to a second operating position by a second movement distance where the second electrical switch is actuated, with the first movement distance of the first gearshift operating part being shorter than the second movement distance of the second gearshift operating part.

11. The bicycle control device as recited in claim 10, further comprising
a third spring member provided between the first gearshift operating part and the first electrical switch for returning the first gearshift operating part to the first rest position; and
a fourth spring member provided between the second gearshift operating part and the second electrical switch for returning the second gearshift operating part to the second rest position, with the first and second spring members being provided in a free state, the third and fourth spring members being provided in a compressed state, and a spring constant of the third and fourth spring members being smaller than a spring constant of the first and second spring members.

12. A bicycle control device comprising:
a brake bracket configured to be mounted to a handlebar;
a brake lever pivotally mounted to the brake bracket;
a first gearshift operating part movable relative to the brake lever, the first gearshift operating part having a first operating surface for executing a gearshift operation;
a second gearshift operating part that is separate from the first gearshift operating part and movable relative to the brake lever, the second gearshift operating part having a second operating surface arranged in proximity to the first operating surface;
a first electrical switch operated with the first gearshift operating part; and
a second electrical switch operated with the second gearshift operating part,
the second gearshift operating part being arranged such that when the first gearshift operating part is moved relative to the brake lever, the second gearshift operating part moves relative to the brake lever along with the first gearshift operating part,
the first operating surface having a first texture that is different from a second texture of the second operating surface.

13. The bicycle control device as recited in claim 12, wherein
one of the first and second operating surfaces is a roughened surface and the other is a smooth surface.

14. The bicycle control device as recited in claim 12, wherein
a hardness of the first operating surface is different from a hardness of the second operating surface.

15. A bicycle control device comprising:
a brake bracket configured to be mounted to a handlebar;
a brake lever pivotally mounted to the brake bracket;
a first gearshift operating part movable relative to the brake lever;
a second gearshift operating part that is separate from the first gearshift operating part and movable relative to the brake lever;
a first electrical switch operated with the first gearshift operating part; and a second electrical switch operated with the second gearshift operating part, the second gearshift operating part being arranged such that when the first gearshift operating part is moved relative to the brake lever, the second gearshift operating part moves relative to the brake lever along with the first gearshift operating part, the first and second gearshift operating parts being mounted on the brake lever.

16. The bicycle control device as recited in claim 15, wherein the first and second gearshift operating parts are directly pivotally connected to the brake lever about a single pivot axis.

17. A bicycle control device comprising:

a brake bracket configured to be mounted to a handlebar;

a brake lever pivotally mounted to the brake bracket;

a first gearshift operating part movable relative to the brake lever;

a second gearshift operating part that is separate from the first gearshift operating part and movable relative to the brake lever;

a first electrical switch operated with the first gearshift operating part; and a second electrical switch operated with the second gearshift operating part, the second gearshift operating part being arranged such that when the first gearshift operating part is moved relative to the brake lever, the second gearshift operating part moves relative to the brake lever along with the first gearshift operating part, the first and second electrical switch being mounted on the brake lever.

18. The bicycle control device as recited in claim 17, wherein the first gearshift operating part is movable from a first rest position to a first operating position by a first movement distance where the first electrical switch is actuated, the second gearshift operating part is movable from a second rest position to a second operating position by a second movement distance where the second electrical switch is actuated, with the first movement distance of the first gearshift operating part being shorter than the second movement distance of the second gearshift operating part.

* * * * *